US005877836A

United States Patent [19]

Miura et al.

[11] Patent Number: 5,877,836
[45] Date of Patent: Mar. 2, 1999

[54] LIQUID CRYSTAL DEVICE AND PROCESS FOR PRODUCTION THEREOF

[75] Inventors: Seishi Miura, Atsugi; Hideaki Takao, Machida; Masanobu Asaoka, Yokohama; Bunryo Sato, Hachiohji; Tadashi Mihara, Isehara; Yasuto Kodera, Fujisawa; Makoto Kojima, Hino; Masamichi Saito, Inagi; Sunao Mori, Yokohama; Kazuhiro Aoyama, Atsugi, all of Japan

[73] Assignee: Canon Kabushiki Kaisha, Tokyo, Japan

[21] Appl. No.: 44,801

[22] Filed: Mar. 20, 1998

Related U.S. Application Data

[62] Division of Ser. No. 379,755, Jan. 27, 1995, Pat. No. 5,815,230.

[30] Foreign Application Priority Data

Jan. 27, 1994 [JP] Japan .................................. 6-007617
Jan. 28, 1994 [JP] Japan .................................. 6-008172
Jan. 28, 1994 [JP] Japan .................................. 6-008173
Jan. 31, 1994 [JP] Japan .................................. 6-009065
Jan. 31, 1994 [JP] Japan .................................. 6-009066

[51] Int. Cl.$^6$ ...................... G02F 1/1341; G02F 1/1337; C09K 19/02
[52] U.S. Cl. .......................... 349/184; 349/172; 349/129
[58] Field of Search .................................. 349/129, 172, 349/184

[56] References Cited

U.S. PATENT DOCUMENTS

| 4,712,874 | 12/1987 | Sekimura et al. | 350/339 F |
|---|---|---|---|
| 5,035,491 | 7/1991 | Kawagishi et al. | 350/350 S |
| 5,182,662 | 1/1993 | Mihara | 359/63 |
| 5,223,963 | 6/1993 | Okada et al. | 359/78 |
| 5,303,076 | 4/1994 | Okada et al. | 359/78 |
| 5,321,537 | 6/1994 | Okada et al. | 359/76 |
| 5,377,033 | 12/1994 | Radcliffe | 359/75 |
| 5,381,256 | 1/1995 | Hanyu et al. | 359/75 |
| 5,467,209 | 11/1995 | Hotta et al. | |
| 5,500,749 | 3/1996 | Inaba et al. | 349/126 |
| 5,543,943 | 8/1996 | Hanyu et al. | |
| 5,668,615 | 9/1997 | Miyata et al. | 349/126 |
| 5,790,223 | 8/1998 | Hanyu et al. | 349/184 |

FOREIGN PATENT DOCUMENTS

| 0613037 | 8/1994 | European Pat. Off. | 359/75 |
|---|---|---|---|
| 10118 | 1/1982 | Japan | 359/75 |
| 160415 | 7/1991 | Japan | 359/75 |

OTHER PUBLICATIONS

Japense Journal of Applied Physic, vol. 19, No. 10 (1980) 2013–14.

*Primary Examiner*—William L. Sikes
*Attorney, Agent, or Firm*—Fitzpatrick, Cella, Harper & Scinto

[57] ABSTRACT

A liquid crystal device is constituted by a pair of oppositely disposed substrates having opposing inner surfaces and opposing electrodes thereon, and a chiral smectic liquid crystal assuming two stable states disposed between the opposing electrodes. The opposing inner surfaces of the pair of substrates have been subjected to an aligning treatment such that the liquid crystal placed in one of the two stable states moves under application of an electric field in a direction identical to one in which the liquid crystal placed in the other of the two stable states moves under the application of the electric field. The liquid crystal device has an effective optical modulation region and a peripheral region outside the effective optical modulation region, wherein the effective optical modulation region and the photosensitive member have been subjected to different aligning treatments. In the liquid crystal device thus constituted, a liquid crystal movement liable to cause yellowing or fluctuation in drive parameters otherwise is effectively compensated by a liquid crystal movement in the peripheral region.

5 Claims, 16 Drawing Sheets

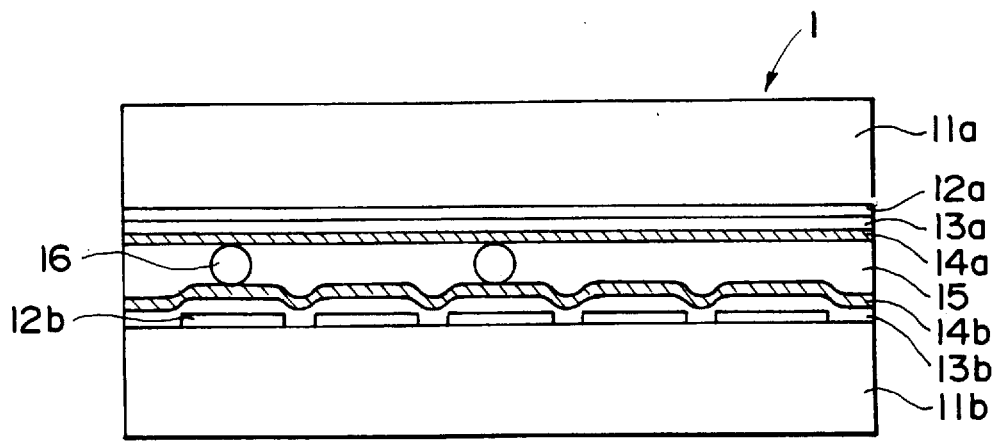
F I G. 1
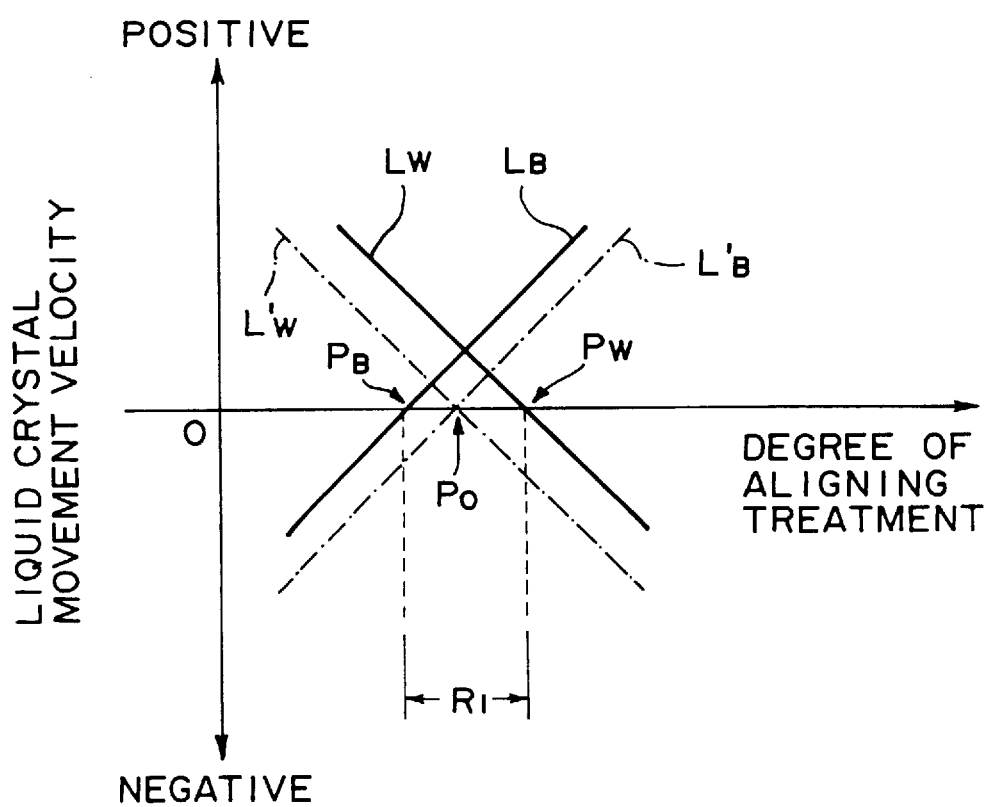
F I G. 2

BEFORE ELECTRIC FIELD APPLICATION

AFTER ELECTRIC FIELD APPLICATION

AFTER ELECTRIC FIELD APPLICATION

LIQUID CRYSTAL DEVICE AND PROCESS FOR PRODUCTION THEREOF

This application is a division of application Ser. No. 08/379,755, filed Jan. 27, 1995 now U.S. Pat. No. 5,815,230.

FIELD OF THE INVENTION AND RELATED ART

The present invention relates to a liquid crystal device which may be used as a display device for a television receiver, a view finder for a video camera or a terminal monitor for a computer, or a light valve for a liquid crystal printer, a projector, etc., and a process for production of such a liquid crystal device.

A liquid crystal display device of a passive matrix drive-type using a TN (twisted nematic) liquid crystal has been known as a device which can be produced at a relatively low cost. The passive matrix-drive type liquid crystal device using a TN-liquid crystal has a certain limitation due to the occurrence of a crosstalk or a lowering in contrast along with the increase in number of drive lines so that it cannot be said to be suitable as a display device requiring a high resolution and a large number of drive lines, e.g., a liquid crystal television panel.

As a type of liquid crystal device having solved such a fundamental problem of a conventional TN-liquid crystal device, there has been known a ferroelectric liquid crystal device having bistability. In the ferroelectric liquid crystal device, a liquid crystal showing a chiral smectic phase, such as chiral smectic C (SmC*) phase or chiral smectic H (SmH*) phase, in its operational state is used. The liquid crystal tends to assume one of two bistable states and does not readily assume an intermediate molecular position. Further, this type of liquid crystal quickly assumes one of the two stable states in response to an electric field applied thereto and retains the resultant state in the absence of an electric field. By utilizing a chiral smectic liquid crystal showing such properties to constitute a liquid crystal device, it has become possible to provide substantial improvements to the problems of a conventional TN-liquid crystal device, inclusive of a poor viewing angle characteristic.

However, in a display apparatus including such a liquid crystal device as a display panel, there has been found a problem that the panel is locally tinted yellow or provides a color image with a locally different hue on continuation of images. We have called the phenomenon "yellowing". The phenomenon has been found to be caused through movement of liquid crystal molecules along extensions of a pair of substrates constituting the panel to provide a region of a higher liquid crystal molecule density per unit area at the destination of the liquid crystal movement and a larger spacing between the substrates (i.e., a layer cell thickness). On the other hand, there arises a region of a lower liquid crystal molecule density on the opposite side where an alignment defect is liable to be caused.

In order to suppress such a liquid crystal molecular movement, there has been proposed a technique of roughening the inner surface of a substrate in U.S. Pat. No. 5,381,256 to Hanyu, et al.

The above-mentioned inner surface roughening technique has not been always satisfactory. This is because the yellowing can be still liable to be caused on a display of a certain graphic display pattern due to a local cell thickening due to concentration of liquid crystal molecules within an effective display area.

Further, such a technique of suppressing liquid crystal molecular movement is accompanied with a problem that, once such "yellowing" is actually caused due to liquid crystal movement, it is difficult to restore the original normal state. Such a cell thickness change is problematic not only in such a display apparatus but also in an optical modulation device for exposure control as in a liquid crystal printer.

Further, according to the above-mentioned surface roughening technique, it has been still difficult to provide a product device which is free from the yellowing to a level required of a commercially successful product. This is because a liquid crystal device is not always used under constant environmental conditions and the change in environmental condition can increase the possibility of yellowing. Accordingly, a product device developed heretofore may be satisfactory in a development study level but may not be sufficiently satisfactory at a level of satisfying severe consumer's demands.

SUMMARY OF THE INVENTION

In view of the above-mentioned problems of the prior art, an object of the present invention is to provide a liquid crystal device having a simple structure, in which a cell thickness change hardly occurs, and also a process for producing such a liquid crystal device.

According to a first aspect of the present invention, there is provided a liquid crystal device comprising a pair of oppositely disposed substrates having opposing inner surfaces and opposing electrodes thereon, and a chiral smectic liquid crystal assuming two stable states disposed between the opposing electrodes; wherein the opposing inner surfaces of said pair of substrates have been subjected to an aligning treatment such that the liquid crystal placed in one of the two stable states moves under application of an electric field in a direction identical to one in which the liquid crystal placed in the other of the two stable states moves under the application of the electric field, and said liquid crystal device has an effective optical modulation region and a peripheral region outside the effective optical modulation region, wherein the effective optical modulation region and the photosensitive member have been subjected to different aligning treatments.

A first discovery of ours leading to the invention is that it is possible to change the direction of movement of liquid crystal molecules by controlling an alignment state even if the liquid crystal molecules are placed in any one of the two stable states.

Based on the above knowledge, if the aligning treatment-dependence of the liquid crystal movement velocity is measured in advance, it has become possible to make the liquid crystal movement directions of liquid crystal molecules in two stable states identical to each other by setting the aligning treatments applied to a pair of substrates based on the measured aligning treatment-dependence.

Further, by providing a peripheral region of a higher pretilt (angle) outside an effective optical modulation region, it is possible to move a portion of the liquid crystal from a higher density region to a lower density region, respectively formed temporarily, via the peripheral region, thereby to suppress the density change of liquid crystal over the extension of a liquid crystal device, particularly in the effective optical modulation region thereof.

According to a second aspect of the present invention, there is provided a liquid crystal device comprising a pair of oppositely disposed substrates having opposing inner surfaces and opposing electrodes thereon, and a chiral smectic liquid crystal assuming two stable states disposed between the opposing electrodes, said liquid crystal device having an effective optical modulation region and a peripheral region outside the effective optical modulation region; wherein in the effective optical modulation region, the liquid crystal placed in one of the two stable states moves at a velocity $V_1$ under application of an electric field and the liquid crystal placed in the other of the two stable state moves at a velocity $V_2$ under application of the electric field so that one of $V_1$ and $V_2$ having a larger absolute value is at most 0.3 mm/hr, and the effective optical modulation region and the peripheral region have been subjected to different aligning treatments.

In this device, the liquid crystal is aligned in a high pretilt state in the peripheral region outside the effective optical modulation region, whereby the liquid crystal is caused to move from a higher liquid crystal molecule density region to a lower liquid crystal molecule density region via the peripheral region, so that yellowing is substantially obviated even if the liquid crystal molecular movement is caused. Further, this effect is enhanced by specifying the liquid crystal molecular movement speed to promote the effect of the peripheral region. As a result, the yellowing is not readily caused even in the case of a certain display pattern which has caused a cell thickness change in a conventional device.

According to a third aspect of the present invention, there is provided a process for producing a liquid crystal device comprising a pair of oppositely disposed substrates having opposing inner surfaces and opposing electrodes thereon, and a chiral smectic liquid crystal assuming two stable states disposed between the opposing electrodes, said liquid crystal device having an effective optical modulation region and a peripheral region outside the effective optical modulation region; said process comprising:

coating at least one substrate with different alignment films in the effective optical modulation region and in the peripheral region, disposing a masking member on the alignment film in the peripheral region, and rubbing the alignment films.

According to a fourth aspect of the present invention, there is provided a process for producing a liquid crystal device comprising a pair of oppositely disposed substrates having opposing inner surfaces and opposing electrodes thereon, and a chiral smectic liquid crystal assuming two stable states disposed between the opposing electrodes, said liquid crystal device having an effective optical modulation region and a peripheral region outside the effective optical modulation region; said process comprising:

applying a masking film in the peripheral region of at least one substrate, and selectively rubbing the effective optical modulation region of said at least one substrate.

In a liquid crystal device prepared in the above-described processes, the liquid crystal is aligned in a higher pretilt state in the peripheral region outside the effective optical modulation region, so that the liquid crystal can be moved from a higher liquid crystal molecule density region to a lower liquid crystal molecular density region via the peripheral region. As a result, even if the liquid crystal molecular movement is caused, the yellowing is substantially obviated while enhancing the effect of the peripheral region because of an appropriate alignment state therein. Further, even if the yellowing is once caused, the yellowing state can be easily extinguished.

Further, in case where the masking film is used, the effect of the aligning treatment is little deteriorated even if a large number of substrates are respectively treated.

According to a fifth aspect of the present invention, there is provided a liquid crystal device comprising a pair of oppositely disposed substrates having opposing inner surfaces and opposing electrodes thereon, and a chiral smectic liquid crystal assuming two stable states disposed between the opposing electrodes, said liquid crystal device having an effective optical modulation region and a peripheral region outside the effective optical modulation region; wherein at least one of the substrates in the peripheral region is coated with an alignment film comprising a perfluoropolymer so as to provide a larger pretilt of liquid crystal molecules in the peripheral region than in the effective optical modulation region.

In the liquid crystal device thus provided, because of a high pretilt state in the peripheral region, the liquid crystal movement via the peripheral region is promoted to remove a difference in liquid crystal molecule density, thereby substantially alleviating the yellowing even if the liquid crystal molecular movement is caused in the effective optical modulation region. Further, even if the yellowing is once caused, the yellowing state can be easily extinguished.

Further, by providing an alignment film comprising a perfluoro-polymer in the peripheral region, it is possible to provide different alignment states between the peripheral region and the effective optical modulation region without resorting to a mask rubbing.

According to a further aspect of the present invention, there are provided an image forming apparatus and an image display apparatus, respectively, including a liquid crystal device as described above as an exposure means or a display means.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a schematic sectional view of a liquid crystal device in its effective optical modulation region.

FIG. 2 is a graph illustrating a relationship between the liquid crystal movement and the degree of aligning treatment.

DESCRIPTION OF THE PREFERRED EMBODIMENTS

Figure 3B:
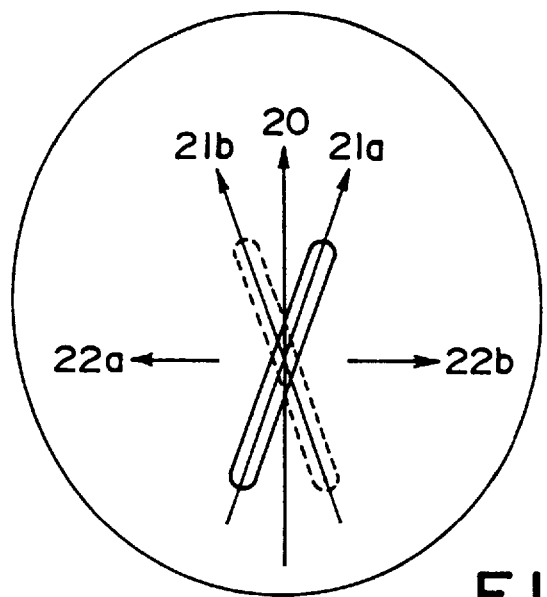
FIGS. 3(A–B) is a schematic view for illustrating liquid crystal movement under voltage application.

The present invention provides an improvement in a type of liquid crystal device having an effective optical modulation region and a peripheral region (or frame region) subjected to mutually different aligning treatments and a process for production of such a liquid crystal device. A part of the peripheral region may be subjected to an aligning treatment identical to that applied to the effective optical modulation region.

The liquid crystal device according to the present invention is basically applicable to any type of optical modulation but may preferably be applied to a type of optical modulation as used in an optical shutter or a light valve capable of controlling the light transmittance through each pixel at binary levels or multiple levels. The pixel addressing scheme may be one of a multiplex scheme using an electrode matrix or a photo-address scheme using a photoconductor film. Embodiments described hereinbelow refer to liquid crystal devices having a two-dimensional electrode matrix suitable for multiplex driving.

The liquid crystal device (cell) according to present invention basically comprises a pair of substrates each of which may be provided with electrodes thereon or may comprise a material which per se functions as an electrode.

More specifically, a substrate may comprise, e.g., glass, quartz, sapphire, silicon, stainless steel or a polymer resin, and at least one of the pair of substrates may preferably be transparent.

A pair of electrodes disposed on the pair of substrates so as to form a pixel include at least one thereof comprising a transparent conductor, suitable examples of which may include tin oxide, indium oxide and indium tin oxide (ITO). The electrodes may preferably have a thickness of 40–200 nm.

An aligning treatment may be formed over the electrodes for alignment control of liquid crystal molecules. The aligning treatment may for example comprise a film of an organic material, such as polyimide, polypyrrole, polyvinyl alcohol, polyamideimide, polyesterimide, polyparaxylylene, polyester, polycarbonate, polyvinyl acetal, polyvinyl chloride, polyamide, polystyrene, cellulosic resin, acrylic resin or melamine resin; or a film of an inorganic material, such as a film of obliquely deposited SiO. The aligning treatment may desirably have a thickness of 5–100 nm.

It is possible to dispose an inorganic film, such as $Ti_xSi_yO_z$ (x=1–2), $SiO_2$, TiO, $Ta_2O_3$ or SiN, between the alignment film and the substrate or the electrodes on the substrate. The inorganic film may be disposed in order to smoothen the inner surface of the substrate and provide an improved insulation between the pair of substrates. It is also sometimes desirable to disperse fine particles in at least one of the inorganic film and the alignment film to provide the inner surface of the substrate with minute unevenness.

Anyway, the alignment film and the manner of aligning treatment may be appropriately selected as will be described with reference to various embodiments hereinbelow.

FIG. 1 is a partial schematic sectional view of a liquid crystal device (cell or panel) in its effective optical modulation region. Herein, the effective optical modulation region refers to a region comprising an assembly of pixels and being effectively used for optical modulation, e.g., for image display in a display device or actually functioning as a light valve for exposure control in a liquid crystal.

Referring to FIG. 1, the liquid crystal device 1 includes a pair of an upper substrate 11a and a lower substrate 11b having thereon electrodes 12a and 12b, optionally disposed insulating films 13a and 13b, and alignment films 14a and 14b, respectively. Between the alignment films 14a and 14b, a liquid crystal 15 is disposed in a layer having a thickness controlled by spacers 16.

In this embodiment of liquid crystal device, the yellowing is prevented by defining aligning treatment methods applied to the alignment films 14a and 14b constituting the inner surfaces of the pair of substrates.

FIG. 2 is a graph showing a relationship between the liquid crystal molecular movement and the aligning treatment, wherein the abscissa represents a degree of surface roughening as a measure of a degree of aligning treatment and the ordinate represents a velocity and direction of liquid crystal molecular movement.

Figure 3A:
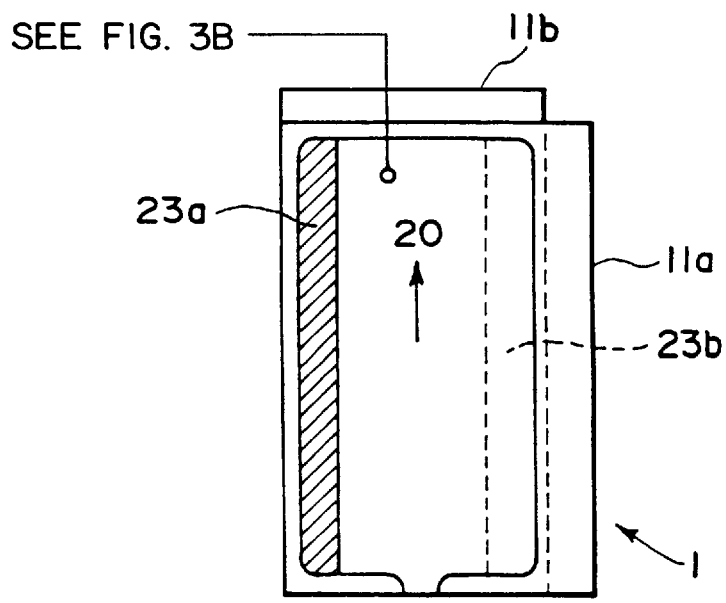

FIG. 3 is a schematic view for illustrating liquid crystal molecular movement under application of an electric field.

In a conventional device, it has been considered that the liquid crystal movement direction 22a or 22b is determined by a relationship between a rubbing direction 20 and an average molecular axis direction 21a or 21b. As the liquid crystal molecular movement direction is related with the rubbing direction, the above-mentioned phenomenon is assumed to depend on the pretilt state at the substrate surfaces. In FIG. 3, reference numeral 21a (or 21b in a reverse orientation state) denotes an average molecular axis (director) orientation in either one of two stable states of ferroelectric liquid crystal molecules. When the liquid crystal molecules are oriented to provide the average molecular axis 21a and are supplied with a certain strength of AC electric field not causing a switching to the orientation state 21b, the liquid crystal molecules are liable to move in the direction of an arrow 22a.

Accordingly, when the liquid crystal molecules in the entire cell are placed in a state providing an average molecular axis direction 21a, the liquid crystal molecules in the cell are liable to move under AC application in the direction of the arrow 22a, i.e., from the right to the left in the figure. As a result, the cell thickness in a region 23a is increased gradually to show a yellowish tint. If the liquid crystal molecules are placed in a state providing an average molecular axis 21b, the liquid crystal movement under AC application is caused in the reverse direction 22b to cause "yellowing" on a right side region 23b. The above description is made with reference to the case of using a liquid crystal material having a negative spontaneous polarization.

In contrast to what described above, it has been found through our experiments that the liquid crystal movement phenomenon depends on an aligning treatment state applied of a liquid crystal device.

Referring to FIG. 2, a solid line $L_B$ represents a relationship between liquid crystal movement velocity and degree of aligning treatment ($V_{LC}$-$D_{AT}$ or V-D relationship) for a liquid crystal molecule having an orientation 21a in FIG. 3 and a solid line $L_W$ represents a V-D relationship for a liquid crystal molecule having an orientation 21b. Ideally, if it is possible that a cell having characteristics of dashed lines $L_B'$ and $L_W'$ and the degree of aligning treatment is set to a point $P_0$, the liquid crystal movement can be suppressed, but the dashed lines $L_B'$ and $L_W'$ depend on a liquid crystal material, a drive voltage and a cell structure, so that it is difficult to develop an alignment state providing such an ideal point $P_0$.

Further, if the provision of such an ideal point $P_0$ is pursued, zero deviation from the designed aligning treatment is required so that the production yield is necessarily lowered, thus making it difficult to lower the device production cost.

Accordingly, in the present invention, the degree of aligning treatment is confined within a range $R_1$ shown in FIG. 2 so as to make the liquid crystal movement directions in the two stable orientation states (21a and 21b in FIG. 3) to be equally positive. On the other hand, as it is possible to suppress the liquid crystal in one of the two stable states, it is possible to make only the liquid crystal in either one of the two stable states move in a prescribed direction, but this method cannot provide a large latitude in aligning treatment. In the above, it should noted that the movement direction of positive or negative is merely a relative matter.

The range $R_1$ (i.e., the $L_B$ and $L_W$ characteristics) depends on a liquid crystal material, a drive voltage and a cell structure used. Accordingly, in production of a liquid crystal device according to the present invention, it is desired to obtain characteristics as shown in FIG. 2 in advance, e.g., by producing a large number of test samples by fixing the liquid crystal material and drive voltages and changing the degree of aligning treatment, and then to adopt an optimum range $R_1$. (Cell structure)

Based on the above basic feature, a preferred embodiment of the liquid crystal device according to the present invention will now be described.

In this embodiment, a frame region (peripheral region) is formed outside an effective display region (effective optical modulation region) so that, even if the liquid crystal movement occurs in the effective display region, the liquid crystal molecule distribution change due to the liquid crystal movement is canceled by the frame region. The frame region need not be a completely encircling one but can be formed on only both sides (e.g., in FIG. 3) if the density change in the effective display region is suppressed thereby.

Figure 4:
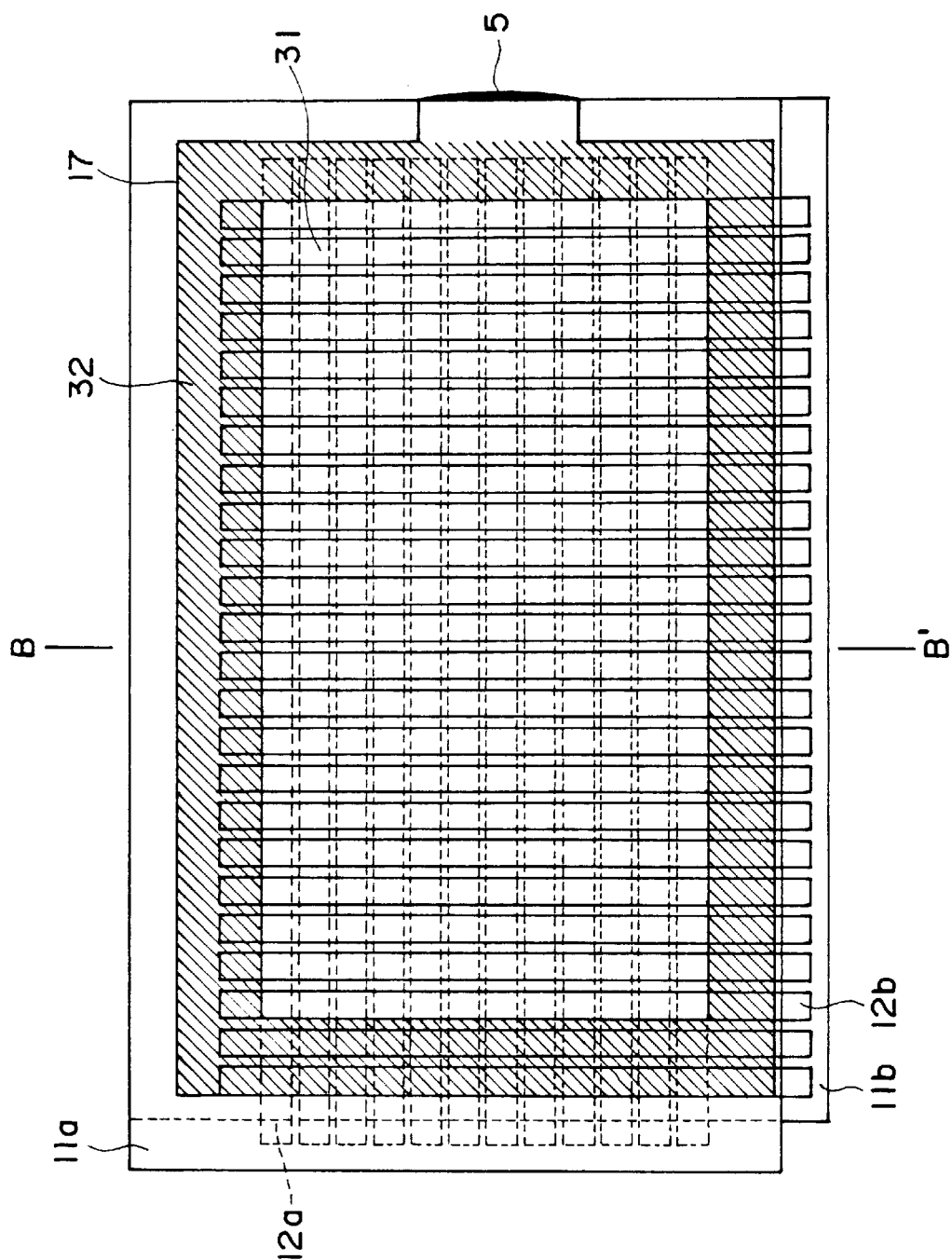
FIG. 4 is a schematic top view for illustrating a structure of a liquid crystal device according to the invention.
Figures 5A, 5B:
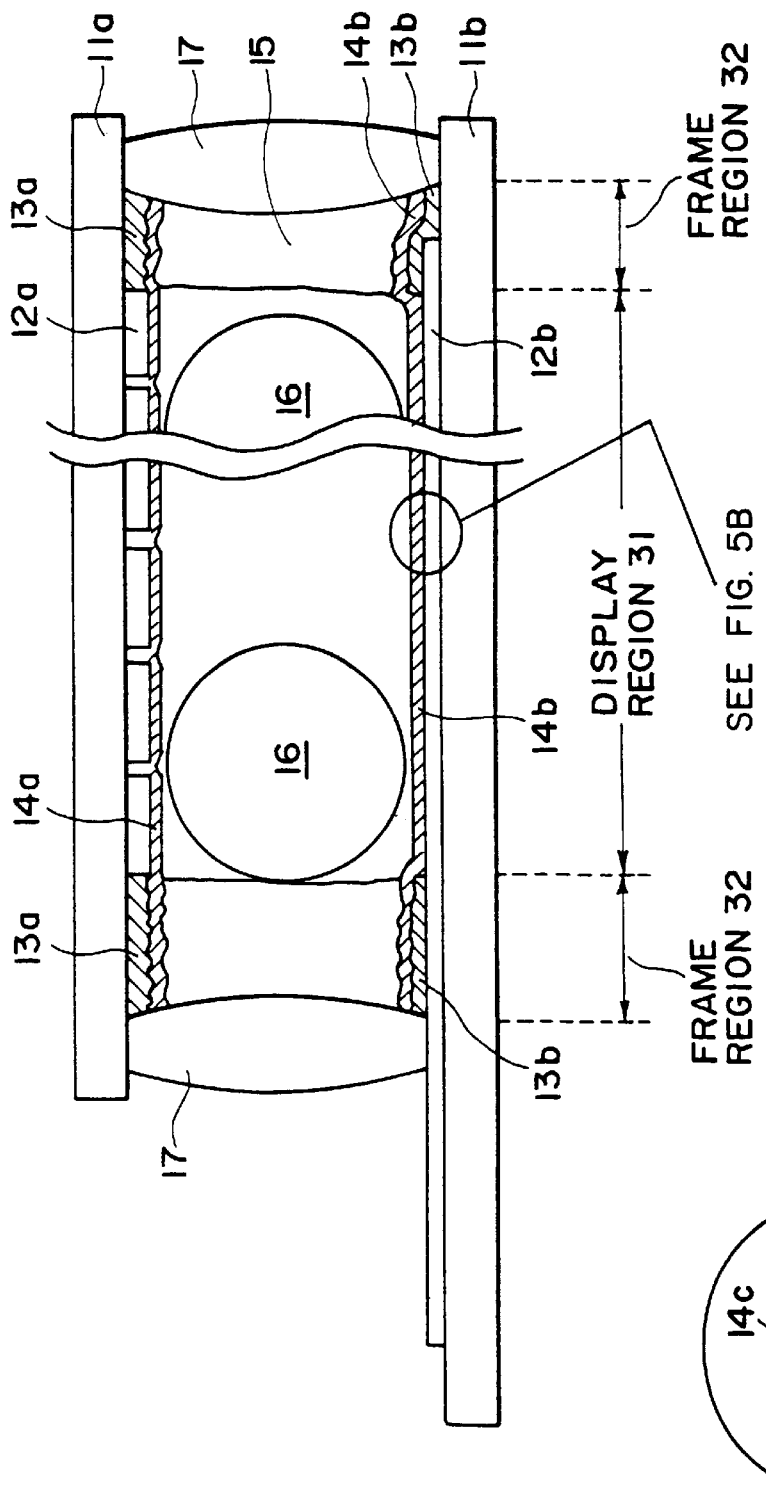
FIGS. 5(A–B) is a sectional view taken along a line B–B' in FIG. 4.

FIG. 4 is a schematic view of the liquid crystal device (cell) according to this embodiment and FIG. 5 is a sectional view taken along a B-B' line in FIG. 4.

The cell includes a display region 31 (as an effective optical modulation region) comprising vertically 12×laterally 22 pixels composed by two-dimensional matrix electrodes and a frame region 21 (a peripheral region) having a width of at least two pixels so as to surround the display region 31. The display region 31 and the frame region 32 are provided with mutually different alignment states. It is preferred to apply an aligning treatment to the inner surfaces of the substrates so that the liquid crystal molecules in the frame region 32 are aligned at a larger pretilt angle than the liquid crystal molecules in the display region 31. It is further preferred that the longer axes of the molecules in the frame region are aligned homeotropically, i.e., at an angle of at least 45 degrees or, more preferably, substantially perpendicularly to the substrate inner surface. For the homeotropic alignment, the substrate in the frame region 32 is subjected to a homeotropic aligning treatment as shown in FIG. 5. Further, the substrate in the display region 31 may be provided with an alignment film 14b (or 14a) optionally containing minute particles 14c dispersed therein so as to have a rough surface and may be subjected to a rubbing treatment to have a relatively small pretilt angle of at most 25 degrees, more specifically 1–25 degrees, preferably 10–20 degrees. In case where the pair of substrates are caused to have different pretilt angles at their inner surfaces, the difference in angle may be 1–6 degrees, preferably 3–6 degrees. Outside the peripheral region 32, a sealing adhesive 17 is disposed to define a cell structure.

At least one of the opposing electrodes 12a and 12b may preferably comprise a transparent conductor which may suitably be tin oxide, indium oxide, indium tin oxide (ITO), etc. The transparent conductor may be accompanied with a low-resistivity metal conductor layer. The thickness may desirably be set to 40–200 nm.

The alignment films 14a and 14b for alignment control of liquid crystal molecules may comprise a film of an organic material, such as polyimide, polypyrrole, polyvinyl alcohol, polyamideimide, polyesterimide, polyparaxylylene, polyester, polycarbonate, polyvinyl acetal, polyvinyl chloride, polyamide, polystyrene, cellulosic resin, acrylic resin or melamine resin; or a film of an inorganic material, such as an obliquely deposited film of SiO. The thickness may desirably be set to 5–100 nm.

An insulating film can be disposed between the electrodes 12a and the alignment film 14a and/or between the electrodes 12b and the alignment film 14b. The insulating film may for example comprise a film of an inorganic material, such as $Ti_xSi_yO_z$ (x=1–2), $SiO_2$, TiO or $Ta_2O_3$, and may include minute particles having an average diameter of, e.g., ca. 40 nm dispersed therein for surface roughening. The thickness may desirably be 20–300 nm.

The surface roughening treatment may be effected by applying a solution containing Ti and Si, e.g., in a ratio of ca. 1:1 and minute particles dispersed therein onto a substrate, followed by calcination. A desired roughness of the substrate may be obtained by appropriately controlling factors, such as the dispersion density and the average diameter of the minute particles, and the thickness of a layer (such as an alignment film) disposed thereon.

The minute particles for providing an inner surface having a smaller roughness may be dispersed at a dispersion density which is 50–90% of that for providing an inner surface having a larger roughness. The unevenness (i.e., the difference in height) of the inner surface (the alignment film surface) having a smaller roughness may desirably be 50–90% of that of the inner surface (the alignment film surface) having a larger roughness. The minute particles for surface roughening for at least one of the substrate (including one having a smaller inner surface roughness) may preferably have an average diameter of 1–20 nm.

The alignment film may desirably be subjected to a rubbing treatment so as to align liquid crystal molecules at a pretilt angle within a desired range.
(Process for production of a liquid crystal cell)

A transparent substrate of, e.g., glass is provided with a transparent conductor film by a vapor deposition method,d such as CVD, sputtering or iron plating, and the conductor film is patterned into stripes. Thereafter, an insulating film may be formed thereon by vapor deposition as described above or application of a coating solution. Then, a solution containing minute particles is applied thereon, e.g., by printing, prebaked and cured to form a rough surface. Then, an alignment film is formed thereon, e.g., by spin coating of a polyamide acid solution, followed by baking and rubbing. A pair of treated substrates may be provided in this manner. On one of the pair of substrates, spacer beads are dispersed and a sealing agent is applied onto a periphery thereof, and the other substrate is applied thereto while leaving an injection port, through which a liquid crystal material is injected and gradually cooled into a chiral smectic phase. Thus, a chiral smectic liquid crystal cell (device) may be completed.

Basic treatments for surface roughening are described in detail in U.S. Pat. No. 5,381,256 mentioned above.

In order to align liquid crystal molecules, the substrates in the frame region may be subjected to a homeotropic aligning treatment. More specifically, the substrates may be provided with a homeotropic alignment film selectively at their frame region while being provided with a homogeneous alignment film at the display region. Alternatively, a substrate may be provided with an alignment film which provides a small pretilt angle when rubbed but provides a large pretilt angle when not rubbed, and then subjected to rubbing selectively at the display region while masking the frame region. The rubbing may be more preferably performed in manners as adopted in Examples appearing hereinafter.

Next, a mode of rubbing treatment generally applicable to the present invention inclusive of Examples described hereinafter will be described.

Figure 6A:
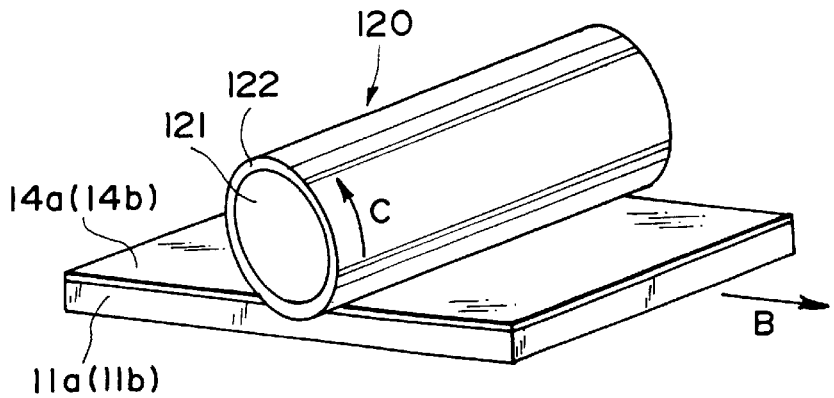
FIGS. 6A and 6B are a schematic perspective view and a side view, respectively, for illustrating a rubbing method to produce a liquid crystal device according to the invention.
Figure 6B:
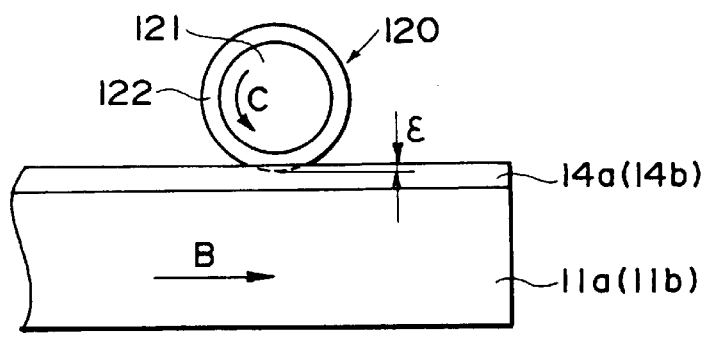

FIGS. 6A and 6B are a perspective view and a side view, respectively, schematically illustrating a manner of rubbing treatment. Referring to these figures, a rubbing apparatus (not entirely shown) includes a rubbing roller 120 which comprises a cylindrical roller 121 and a rubbing cloth 122, such as nylon yarn-planted cloth, wound about the roller 121. The rubbing roller 120 is rotated in a direction C and simultaneously caused to contact an alignment film 14a (or 14b) on a substrate 11a (or 11b) at a prescribed pressure while moving the glass substrate 11a (or 11b) in a direction B or moving the roller 120 in a counterdirection. As a result, the alignment film 14a (14b) is rubbed with the rubbing roller 120 to be imparted with an alignment control power. The alignment control power may primarily be controlled by a contact force acting between the rubbing roller 120 and the substrate 11a (or 11b) and ordinarily by moving the rubbing roller 120 up and down to change a pressing depth ε (FIG. 6B) of the rubbing cloth 122 against the alignment film 14a (14b). The alignment conditions including a setting of the pretilt angle may be controlled by changing a roller rotation speed, a roller feeding speed (relative to the substrate) and the number of rubbing operations in addition to the pressing depth ε.

A pretilt angle as a parameter characterizing an alignment state of a liquid crystal device referred to herein are based on values measured by the crystal rotation method as described in Jpn. J. Appl. Phys. Vol. 19 (1980), No. 10, Short Notes 2013.

More specifically, a sample cell is prepared by applying a pair of substrates each having an alignment film and subjected to a prescribed uniaxial aligning treatment so that, however, the spacing therebetween is about 20 μm and the aligning treatment axis directions are parallel and opposite to each, and the resultant cell is filled with a prescribed liquid crystal material, followed by cooling to complete the sample cell.

For measurement, the sample cell is rotated about an axis which is in parallel with an extension of the substrates and perpendicular to the uniaxial alignment axis direction and, during the rotation, the cell is illuminated with a helium-neon laser beam having a polarization plane and incident to one side of the cell in a direction normal to the rotation axis while changing an angle φ between a normal to the cell and the incident beam in accordance with the rotation, whereby the intensity of the transmitted light is measured by a photodiode from the opposite side through a polarizer having a transmission axis parallel to the polarization plane.

An angle $\phi_x$ among the varying φ values providing the central point of a family of hyperbolic curves in the interference figure thus obtained is substituted in the following equation to the find a pretilt angle α:

$$\sin 2\alpha = \frac{-2\sin\phi_a}{(n_o + n_e)(1 - (\sin\phi_x/n_o)^2)^{1/2}}$$

wherein $n_o$ denotes the refractive index of ordinary ray, and $n_e$ denotes the refractive index of extraordinary ray.

EXAMPLE 1

In this embodiment, a cell structure shown in FIG. 1 is used, and a pair of substrates respectively having roughened inner surfaces are subjected to different aligning treatments so as to provide an identical liquid crystal movement direction for two stable states in a display region (effective optical modulation region). Then, a frame region (peripheral region) is formed surrounding the display region, and the aligning treatment in the frame region is made different from that in the display region. More specifically, the pretilt angle in the frame region is made larger than the pretilt angle in the display region (of 10–25 degrees), and the pretilt angles at two substrates in the display region are made different by 3–5 degrees, whereby the increase in density of liquid crystal molecules due to liquid crystal movement is absorbed by one side and the decrease in density on the other side of the display region is prevented by supplying the excessive liquid crystal from the frame region. In this case, it is preferred that the liquid crystal in the frame region is in a homeotropic alignment state.

In a specific example, two 1.1 mm-thick glass substrates 11a and 11b were coated with 1500 Å-thick ITO films 12a and 12b, which were then patterned into stripe electrodes of 170 μm in width with a spacing of 30 μm therebetween. The stripe electrodes were then coated with 900 Å-thick $Ta_2O_5$ insulating films 13a and 13b for short circuit prevention. Further, each substrate was coated with a $Ti_xSi_yO_z$ precursor solution (containing Ti:Si=1:1, available from Tokyo Ohka K.K.) followed by baking at 300° C. to form a 1200 Å-thick film for surface state improvement, and further coated with a 6 wt. % solution of the $Ti_xSi_yO_x$ precursor containing silica particles of 400 Å in average diameter dispersed therein by using an extender plate of 5 μm in roughness, followed by prebaking at 100° C. for a. 10 min., UV irradiation and baking for ca. 1 hour at 300° C., to form a ca. 200 Å-thick insulating film.

Then, alignment films 14a and 14b were formed by applying a 1.5 wt. % solution of polyamide acid ("LQ 1802", available from Hitachi Kasei K.K.) in a NMP/nB (=1/1) mixture solvent by spin coating under a spinner speed of 2000 rpm for 20 sec., followed by baking at 270° C. for 1 hour.

Then, each substrate was subjected to rubbing in the following manner while masking the frame region thereof with a metal mask so as to be free from rubbing.

The rubbing was performed by using a rubbing roller as described under the conditions of a pressing depth ε of 0.35 mm, a roller rotation speed of 1000 rpm and a roller feed rate of 30 mm/sec. Two types of substrates were provided, i.e., substrates providing a pretilt angle of 20 degrees by repeating the rubbing two times and substrates providing a pretilt angle of 17 degrees by repeating the rubbing four times.

The surface states of the alignment films on the substrates thus prepared were examined by SEM (scanning electron microscope) photographs and AFM (atomic force microscope), whereby the alignment films were found to have unevenness in a width of 5–17 nm at a density of ca. 108/mm$^2$, and with differences in height of 10–25 nm.

Liquid crystal devices having a structure shown in FIGS. 4 and 5 were prepared by dispersing spacer beads 16 (of silica or alumina) having an average diameter of ca. 0.8–1.2 μm or one 11a (or 11b) of the substrates, applying a sealing adhesive 17 of an epoxy resin onto the other substrate 11b (or 11a) by screen printing and superposing and applying them to each other, so that their rubbing directions were substantially parallel to each other. Each cell was filled with a pyrimidine-based ferroelectric liquid crystal having the following phase transition series and parameters and heated to isotropic phase under a reduced pressure by a capillary effect, followed by gradual cooling to obtain a liquid crystal device (including a display region having 12×22 pixels and a frame region having a width of two pixels):

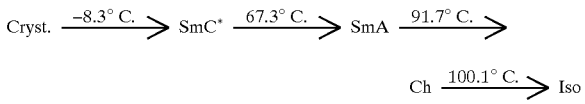

Tilt angle θ=15.1 deg. (at 30° C.)
Layer inclination angle δ=10.2 deg. (at 30° C.)
Spontaneous polarization Ps=5.5 nC/cm$^2$ (at 30° C.)

Figure 7:
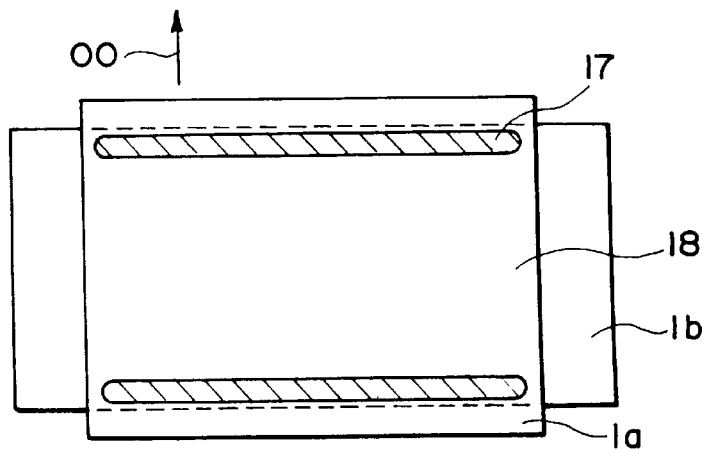
FIG. 7 is a schematic view for illustrating a method of measuring a liquid crystal moving speed in a liquid crystal device.

Separately, by using the substrates and the liquid crystal described above, test cells having a structure as illustrated in FIG. 7 were prepared and used for measurement of the liquid crystal movement speed.

Figure 8A:
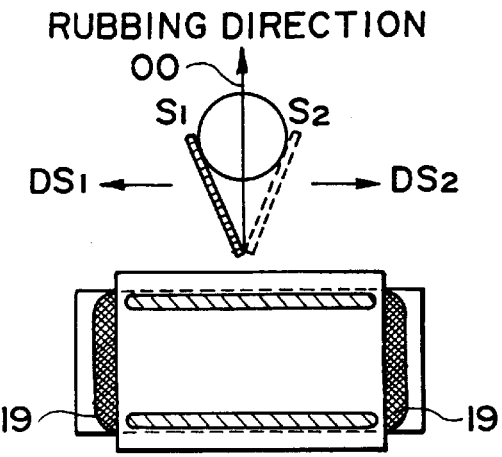
FIGS. 8A to 8C are further schematic views for illustrating the method of measuring the liquid crystal movement speed in a liquid crystal device.
Figure 8B:
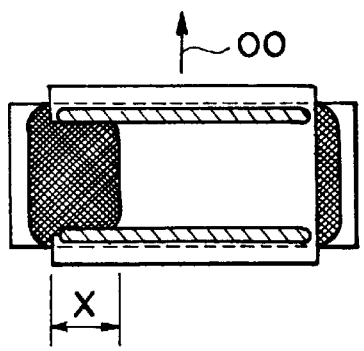
Figure 8C:
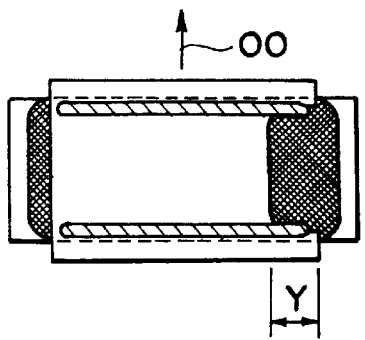

Referring to FIG. 7, in the test cell, two substrates are applied to each other with a sealing adhesive 17 only at two sides and the remaining two sides 18 are made open so as to allow measurement of the liquid crystal movement rate and direction. FIGS. 8A–8C illustrate the manner of the test. Referring to FIG. 8A, the cell is supplied with a sufficiently large voltage so as to orient the average molecular axes of liquid crystal molecules uniformly to $S_1$ direction (or $S_2$ direction) before application of an electric field for causing liquid crystal movement, and, on both open sides of the liquid crystal disposed in the cell, a nematic liquid crystal 19 as a marker is applied. Then, the cell is supplied with an alternating rectangular electric field of a pulse width of 60 μsec and ±6 V/μm for a prescribed period (14 hours) at 40° C. The alternating electric field has an amplitude of ⅓ of the switching threshold so that the average molecular direction $S_1$ or $S_2$ is maintained even after the application thereof for the prescribed period (14 hours). After the application of the alternating electric field, the manner of the invasion of the nematic liquid crystal 19 is observed and measured to evaluate the direction and rate of the liquid crystal movement. More specifically, the invasion length X shown in FIG. 8B represents the liquid crystal movement in the $DS_2$ direction (FIG. 8A) and the invasion length Y shown in FIG. 8C represents the liquid crystal movement in the $DS_1$ direction (FIG. 8A), respectively in the prescribed period (14 hours).

Four types of sample liquid crystal cells 1A, 1B, 1C and 1D were prepared by using substrates and liquid crystal as described above in the following manner.

A sample cell 1A was prepared by using a pair of substrates each subjected to two times of the rubbing and without a frame region having a larger pretilt angle.

A sample cell 1B was identical to the sample cell 1A except that a frame region subjected to a homeotropic aligning treatment.

As a result of measurement as illustrated with reference to FIGS. 8A–8C, the liquid crystal movement directions in the sample cells 1A and 1B were different depending on whether the liquid crystal molecules were placed in the average molecular direction $S_1$ or $S_2$ (FIG. 8A).

A sample cell 1C was prepared by using a pair of substrates including one subjected to two times of the rubbing and the other subjected four times of the rubbing and by providing no frame region of a larger pretilt angle.

A sample cell 1D was identical to the sample cell 1C except for the provision of a frame region as in the sample cell 1B.

As a result of measurement, the liquid crystal movement direction in the sample cells 1C and 1D was not changed regardless of whether the average molecular direction was $S_1$ or $S_2$.

Figure 9:
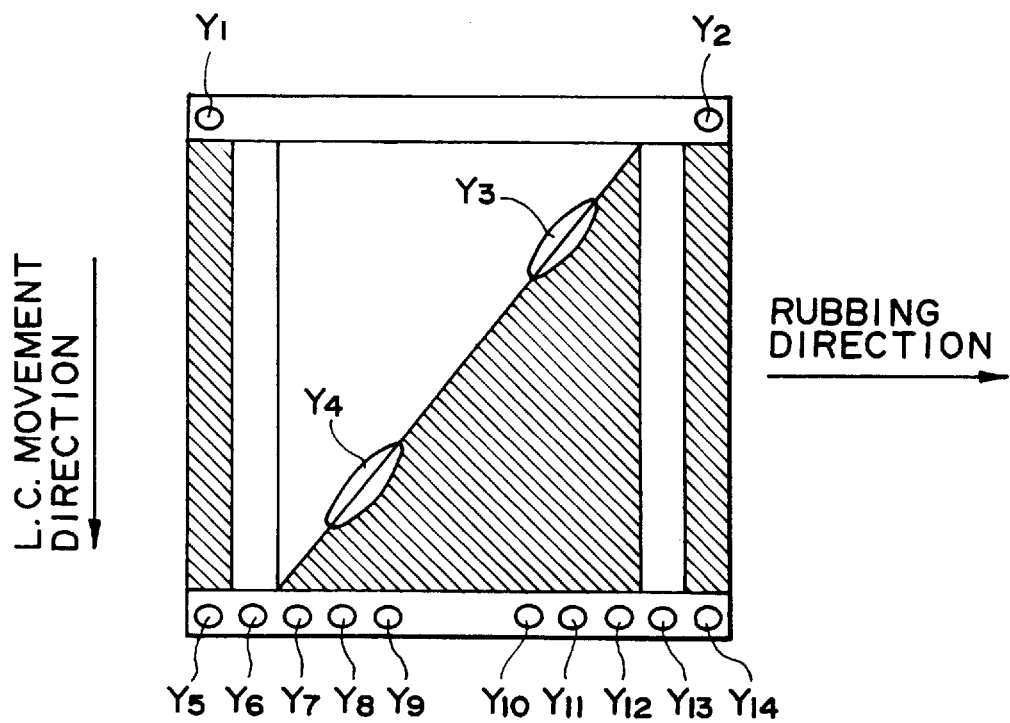
FIG. 9 is a view for illustrating "yellowing".

The respective sample cells were driven in a multiplex manner to display a pattern as shown in FIG. 9 including hatched regions representing a dark state (one stable state) and non-hatched regions representing a bright state (the other stable state), placed in a memory state for displaying the pattern, and then subjected to a refresh drive by applying the same waveforms used in the multiplex drive repetitively for continually displaying the pattern shown in FIG. 9 to observe whether yellowing occurred or not.

As a result, the sample cell 1A caused yellowing at parts $Y_1$, $Y_2$, $Y_3$, $Y_4$, $Y_6$ and $Y_{13}$.

The sample cell 1B caused yellowing only at parts $Y_3$ and $Y_4$.

The sample cell 1C caused yellowing only at parts $Y_5$–$Y_{14}$.

The sample cell 1D caused no yellowing.

EXAMPLE 2

In this embodiment, a cell structure similar to the one used in Example 1 is adopted, but a pair of substrates are caused to have different degrees of roughness so as to provide an identical liquid crystal movement direction for two stable states in a display region. Then, a frame region is formed surrounding the display region, and the aligning treatment in the frame region is made different from that in the display region. Further, the pretilt angle in the frame region is made larger than the pretilt angle in the display region (of 10–25 degrees), whereby the increase in density of liquid crystal molecules due to liquid crystal movement is absorbed by one side and the decrease in density on the other side of the display region is prevented by supplying the excessive liquid crystal from the frame region. In this case, it is preferred that the liquid crystal in the frame region is in a homeotropic alignment state.

Sample cells were prepared in basically the same manner as in Example 1 except as follows. For preparation of each sample cell, the silica fine particles for providing unevenness were dispersed at a rate of 108 particles/mm$^2$ on one substrate so as to provide a pretilt angle of 23 degrees and at a rate of 70 particles/mm$^2$ on the other substrate so as to provide a pretilt angle of 20.5 degrees. Each substrate was subjected to four times of rubbing under the conditions of a roller feed rate of 30 mm/sec.

Two types of cells were prepared including one with no frame region and the other provided with a frame region not subjected to the rubbing.

As a result of measurement as illustrated with reference to FIGS. 8A–8C, the liquid crystal movement direction in the two types of cells was not changed regardless of whether the average molecular axis direction is one or the other of the two stable states.

Each sample cell was subjected to a refresh drive wherein the scanning lines were sequentially selected and, on each selected scanning line, the respective pixels were first reset into the dark state (hatched state in FIG. 9) and then written into the bright state so as to provide the pattern shown in FIG. 9.

Separately, each sample cell was subjected to a refresh drive wherein the scanning lines were sequentially selected and, on each selected scanning line, the respective pixels were first reset into the bright state (non-hatched state in FIG. 9) and then written into the dark state so as to provide the pattern shown in FIG. 9.

In this case, the sample cell provided with no frame region caused yellowing at part $Y_5$–$Y_{14}$ in FIG. 9 but the sample cell provided with the frame region caused no yellowing.

As described above, in any of Examples 1 and 2, the occurrence of yellowing could be suppressed even when a display pattern liable to cause yellowing was displayed, by uniformizing the liquid crystal molecular movement direction for two stable states and providing a larger pretilt angle in the frame region than in the display region.

Figure 10:
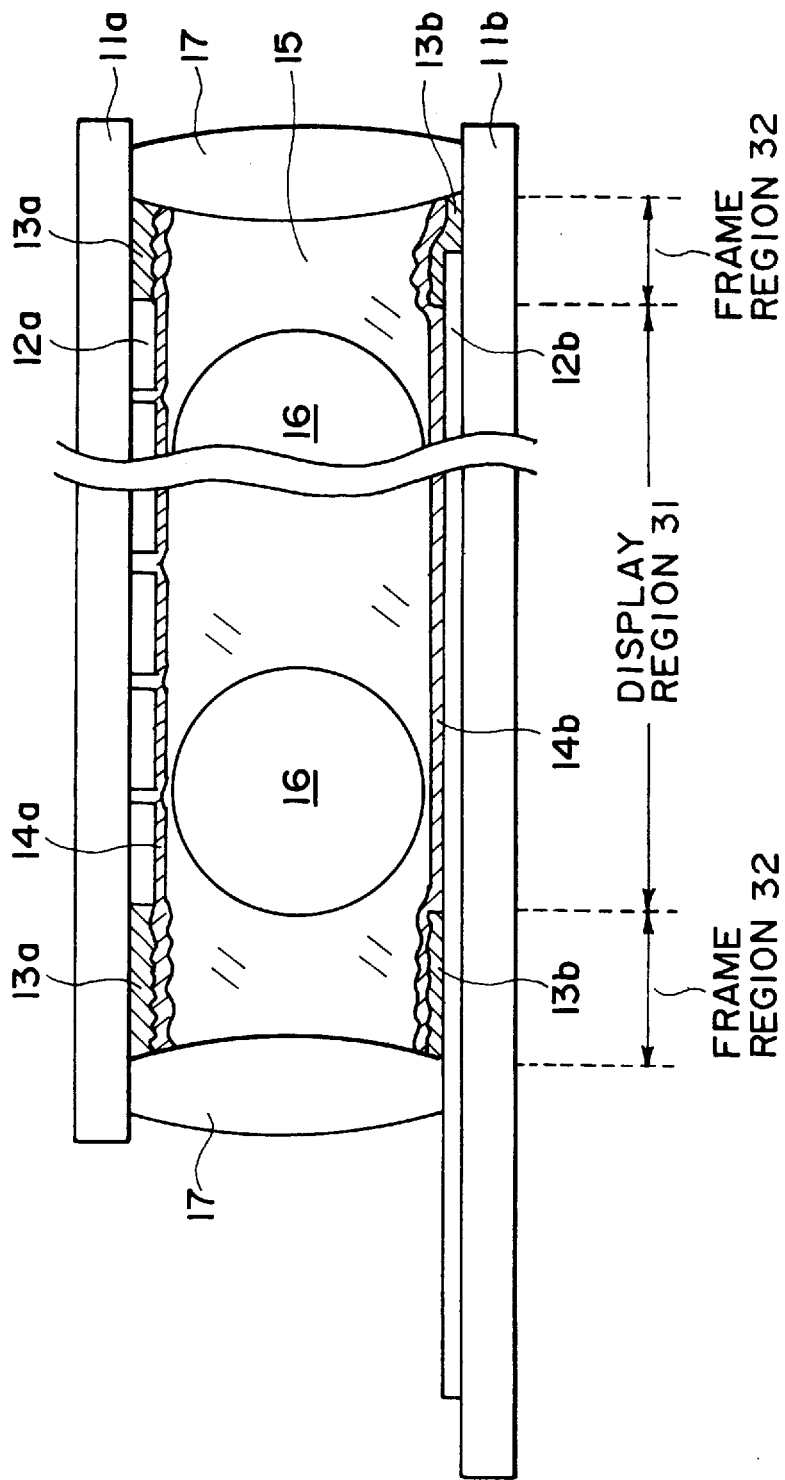
FIG. 10 is a schematic sectional view of another embodiment of the liquid crystal device according to the invention.

FIG. 10 is a schematic sectional view (similar to FIG. 5) showing another embodiment of the liquid crystal device (cell) according to the present invention. The cell includes a pair of substrates 11a and 11b having thereon opposing electrodes 12a and 12b, insulating films 13a and 13b for providing a higher pretilt angle in a frame region (peripheral region) 32, and alignment films 14a and 14b. Between the aligning films 14a and 14b, a liquid crystal material 15 showing a chiral smectic phase is disposed in a layer in a thickness determined by a spacer 16 and confined by a sealing adhesive 17 disposed at the peripheral part.

The cell includes a display region (effective optical modulation region) 31 comprising vertically 12×laterally 22 pixels composed by two-dimensional matrix electrodes and a frame region (peripheral region) 32 surrounding the display region 31 and having a width of at least two pixels. The display region 31 and the frame region 32 are subjected to mutually different aligning treatments. In this instance, it is preferred to apply an aligning treatment so as to provide a pretilt angle (i.e., an angle of longer axes of liquid crystal molecules in the neighborhood of a substrate boundary surface with respect to the boundary surface) of at most 25 degrees in the display region 31. It is also preferred to apply an aligning treatment to the inner surfaces of the substrates so that the liquid crystal molecules in the frame region 32 are aligned at a larger pretilt angle than the liquid crystal molecules in the display region 31. It is further preferred that the longer axes of the molecules in the frame region are aligned homeotropically, i.e., at an angle of at least 45 degrees or, more preferably, substantially perpendicularly to the substrate inner surface.

On the other hand, in the display region (as effective optical modulation region), it is preferred to provide a pretilt angle of 1–25 degrees, more preferably 1–20 degrees, optimally 10–20 degrees.

Further, the larger one in terms of an absolute value of the movement speeds of the liquid crystal in two stable states is suppressed to be at most 0.3 mm/hour. The liquid crystal movement speed may be arbitrarily set depending on the surface states of the inner surfaces of a pair of substrates, drive signal voltages and liquid crystal material used.

Figure 11A:
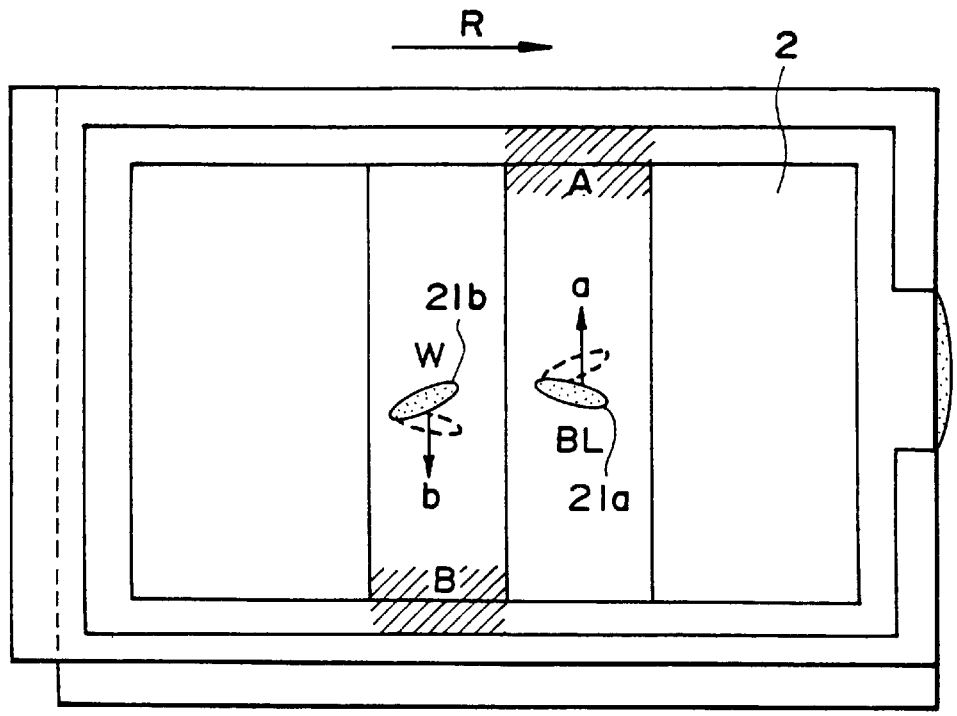
FIGS. 11A and 11B are explanatory views for illustrating a liquid crystal molecular movement in an embodiment of the liquid crystal device according to the invention.

According to another experiment, when a black (BL)-and-white (W) stripe pattern is continually displayed on a display panel formed by rubbing in a direction R as shown in FIG. 11A, liquid crystal molecules in a region of displaying "black" (BL or dark) placed in an average molecular axis direction 21a are moved in the direction of an arrow a to provide a panel side region A which shows a larger cell thickness than the surrounding region. On the other hand, liquid crystal molecules placed in an average molecular axis direction 21b in a region of displaying "white" (W or bright) are moved in the direction of an arrow b to provide a panel side region B having an increased cell thickness on the opposite side.

Figure 11B:
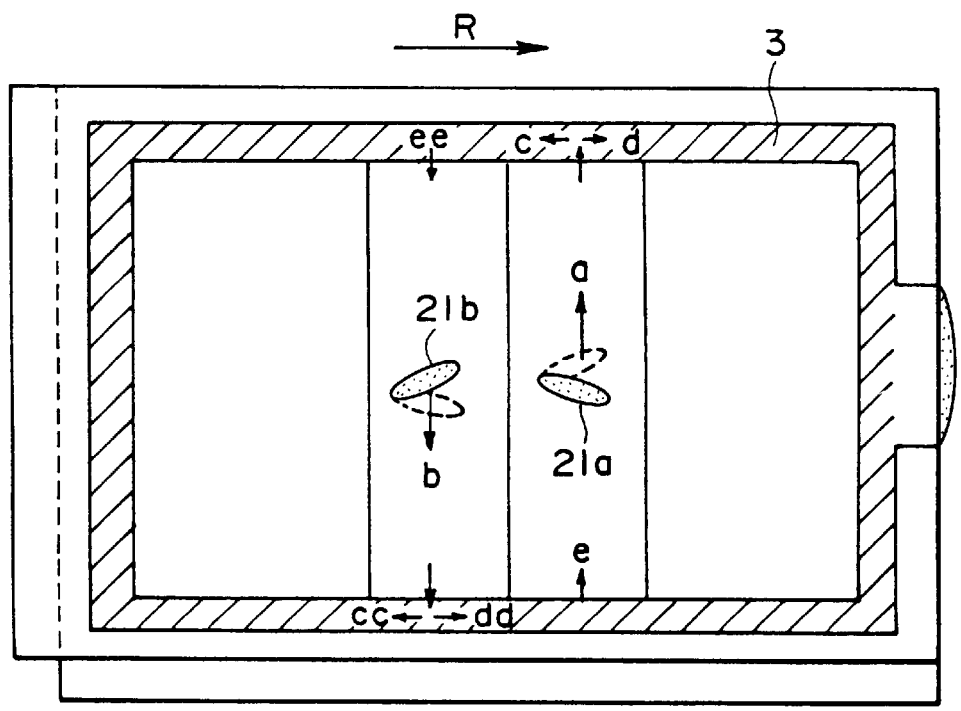

In contrast thereto, it has been found that, in case where a peripheral region 3 is disposed to surround a display region 2 (as an effective optical modulation region) and a high pretilt alignment state is established in the peripheral region as shown in FIG. 11B, the liquid crystal molecules in the black-displaying state moving in the direction a can further move to the peripheral region 3 and the liquid crystal molecules collected in the peripheral region can further move in directions c and d. Reversely, liquid crystal molecules can also move in a direction e.

On the other hand, in the white-display region, accompanying the liquid crystal movement in the direction b, liquid crystal molecules collected in the peripheral region can move in directions cc and dd and also in a direction ee.

The above phenomenon is caused presumably because as liquid crystal molecules are aligned with a higher pretilt angle, i.e., closed to a homeotropic alignment, smectic layers formed along panel surfaces approach an isotropic state, so that liquid crystal molecules are caused to move in an isotropic manner in response to an external electric field applied thereto.

As a result, in a liquid crystal panel according to the present invention, even if a pressure distribution is developed as a result of liquid crystal molecular movement as shown in FIG. 11A, the pressure distribution is relaxed by the isotropic movement of liquid crystal molecules in the peripheral region as shown in FIG. 11B, thereby suppressing the cell thickness increase along a panel side.

The electrodes 12a and 12b and alignment films 14a and 14b may be composed of materials described above with reference to the embodiment of FIG. 5.

The insulating films 13a and 13b may for example comprise a film of an inorganic material, such as $Ti_xSi_yO_z$, $SiO_2$, $TiO$ or $Ta_2O_3$, and may include minute particles having an average diameter of, e.g., ca. 40 nm, dispersed therein for surface roughening to accomplish a high pretilt angle. Alternatively, in order to accomplish a homeotropic alignment in the frame region 32, it is possible to provide a homeotropic alignment film instead of the combination of the insulating film 13a (or 13b) and the alignment film 14a (or 14b).

It is also possible to provide a film having an unevenness like the insulating film 13a and 13b containing minute particles dispersed therein also on a substrate in the display region 31. Such an insulating film for surface roughening may be formed by applying a solution containing Ti and Si, e.g., in a ratio of ca. 1:1 and minute particles dispersed therein onto a substrate, followed by calcination. A desired roughness of the substrate may be obtained by appropriately controlling factors, such as the dispersion density and the average diameter of the minute particles, and the thickness of a layer (such as an alignment film) disposed thereon.

The minute particles for surface roughening for at least one substrate may preferably have an average diameter of 1–20 nm. The insulating film for retaining the minute particles may preferably have a thickness of 20–300 nm.

The alignment film may desirably be subjected to a rubbing treatment so as to align liquid crystal molecules at a pretilt angle within a desired range.

EXAMPLE 3

In this example, a liquid crystal cell having a structure as shown in FIG. 10 was prepared. More specifically, two 1.1 mm-thick glass substrates 11a and 11b were coated with 1500 Å-thick ITO films 12a and 12b, which were then patterned into stripe electrodes of 170 μm in width with a spacing of 30 μm therebetween. The stripe electrodes were then coated with 900 Å-thick $Ta_2O_5$ insulating films. Further, each substrate was coated with a $Ti_xSi_yO_z$ precursor solution (containing Ti:Si=1:1, available from Tokyo Ohka K.K.), followed by baking at 300° C. to form a 1200 Å-thick film for surface state improvement, and further coated with a 6 wt. % solution of the $Ti_xSi_yO_z$ containing silica particles of 400 Å in average diameter dispersed therein by using an extender plate of 5 μm in roughness, followed by prebaking at 100° C. for a. 10 min., UV irradiation and baking for ca. 1 hour at 300° C., to form a ca. 200 Å-thick insulating film.

Then, alignment films 14a and 14b were formed by applying a 1.5 wt. % solution of polyamide acid ("LQ 1802", available from Hitachi Kasei K.K.) in a NMP/nB (=1/1) mixture solvent by spin coating under a spinner speed of 2000 rpm for 20 sec., followed by baking at 270° C. for 1 hour.

The surface states of the alignment films on the substrates thus prepared were examined by SEM (scanning electron microscope) photographs and AFM, whereby the alignment films were found to have unevenness in a width of 5–17 nm at a density of ca. $108/mm^2$, and with differences in height of 10–25 nm.

Then, each substrate was subjected to rubbing in the following manner while masking the frame region thereof with a masking member so as to be free from rubbing.

The rubbing was performed by using a rubbing roller as described under the conditions of a pressing depth ε of 0.35 mm, a roller rotation speed of 1000 rpm and a roller feed rate of 30 mm/sec. Each substrate was rubbed two times so as to provide a pretilt angle of 20 degrees.

Liquid crystal devices having a structure shown in FIG. 10 was prepared by dispersing spacer beads 16 (of silica or alumina) having an average diameter of ca. 0.8–1.2 μm or one 11a (or 11b) of the substrates, applying a sealing adhesive 17 of an epoxy resin onto the other substrate 11b (or 11a) by screen printing and superposing and applying them to each other, so that their rubbing directions were substantially parallel to each other. (Incidentally, it is also possible to dispose the uniaxial alignment treatment directions applied to the pair of substrates 11a and 11b intersect each other at an angle θc satisfying 0 deg. <θc<20 deg.) Each cell was filled with a pyrimidine-based ferroelectric liquid crystal having the following phase transition series and parameters and heated to isotropic phase under a reduced pressure by a capillary effect, followed by gradual cooling to obtain a liquid crystal device (including a display region having 12×22 pixels and a frame region having a width of two pixels):

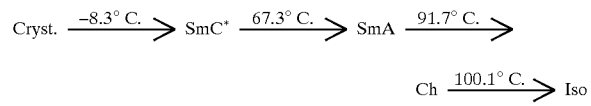

Tilt angle θ=15.1 deg. (at 30° C.)
Layer inclination angle δ=10.2 deg. (at 30° C.)
Spontaneous polarization Ps=5.5 $nC/cm^2$ (at 30° C.)

Separately, by using the substrates and the liquid crystal described above, test cells having a structure as illustrated in FIG. 7 were prepared and used for measurement of the liquid crystal movement speed in the same manner as in Example 1.

From the following evaluation, it will be understood that the cell thickness change in a central region due to liquid crystal movement is suppressed by specifying the liquid crystal movement velocity and the cell thickness change in the peripheral part is suppressed due to the presence of a high pretilt peripheral region.

Figures 12, 13:
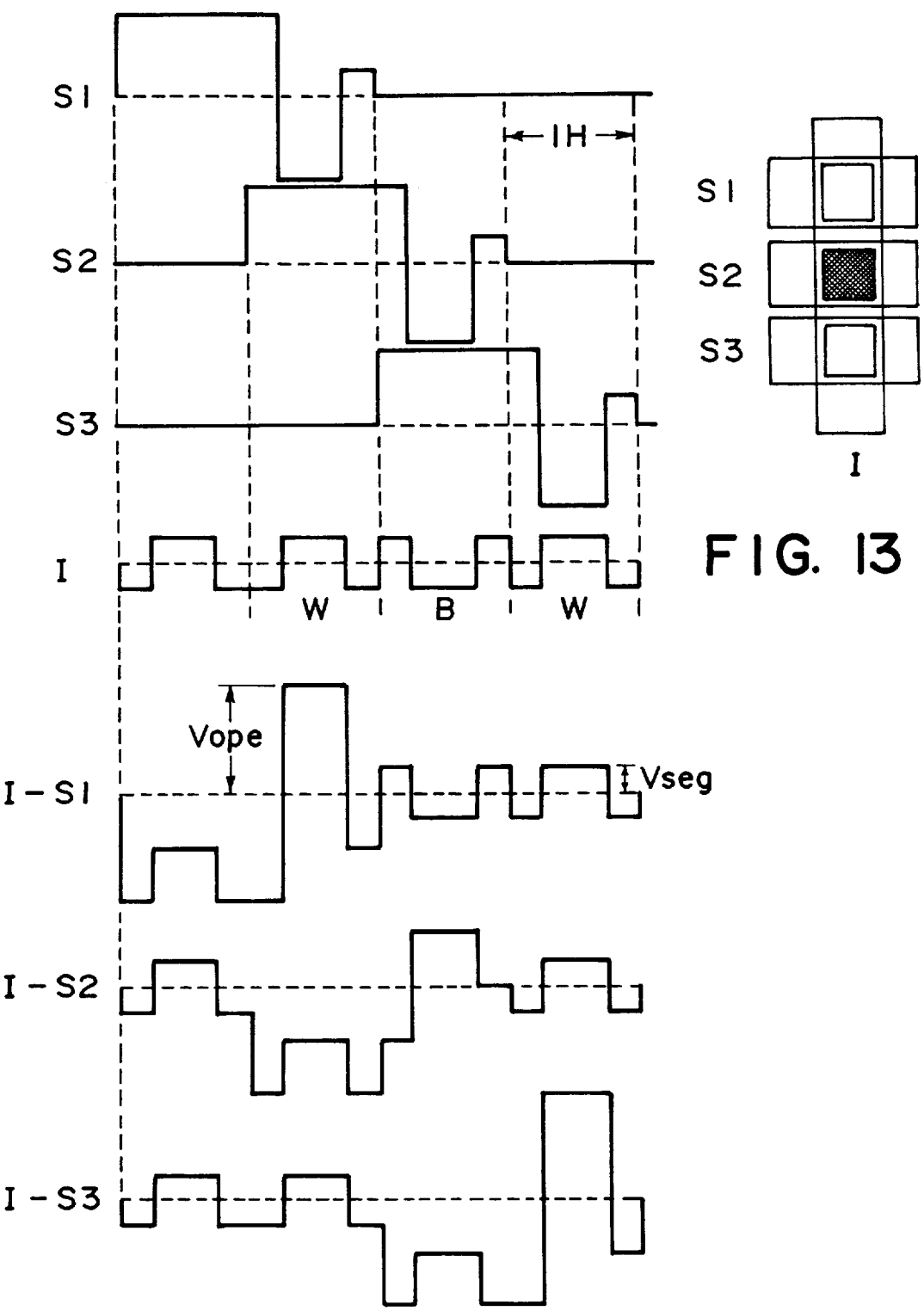
FIG. 12 is a diagram for illustrating a set of waveforms for driving a liquid crystal device according to the invention.
FIG. 13 illustrate a state of pixels formed by the waveforms shown in FIG. 12.
Figure 14:
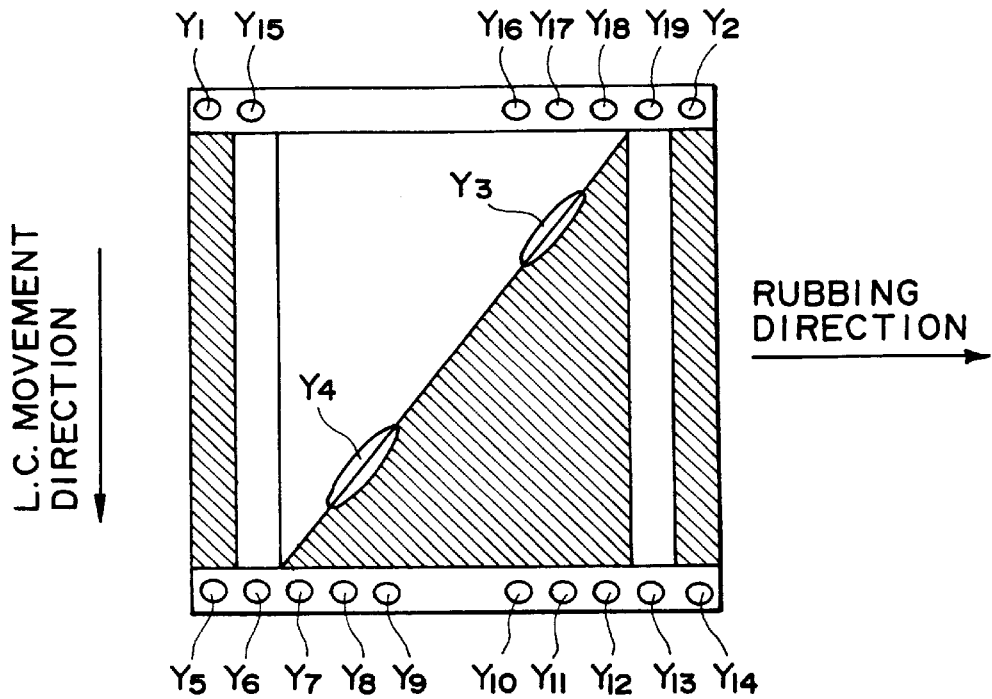
FIGS. 14 and 15 are respectively a view for illustrating "yellowing".

More specifically, a sample liquid crystal device prepared in this Example 3 was subjected to 20 hours of a refresh drive wherein a display pattern as shown in FIG. 14 was repetitively displayed by repeatedly applying basic drive signals shown in FIG. 12 (illustrating, e.g., a combination of signals providing a display state shown in FIG. 13). Referring to FIG. 12, at $S_1$, $S_2$ and $S_3$ are shown scanning signals applied to pixels on mutually adjacent scanning lines and at I is shown a succession of data signals applied to a data line for the pixels. Each pixel on a selected scanning line is first reset into a black (dark) state and either rewritten into a white (bright) state by application of a writing voltage Vope corresponding to a data signal W having a voltage Vseq or caused to retain the black state corresponding a data signal B. Herein, a ratio Vseq/Vope is referred to as a bias ratio Rv. In the test, Vope was fixed at 26 volts.

In a drive under Rv=1/2.4, the liquid crystal movement speed was 0.6 mm/hour, and yellowing slightly occurred only at $Y_3$ and $Y_4$ in FIG. 14 while yellowing did not occur within ca. 15 hours.

In a drive under Rv=1/3.0, the liquid crystal movement speed was 0.4 mm/hour and, also in this case, slight yellowing occurred only at parts $Y_3$ and $Y_4$ in FIG. 14, while the yellowing did not occur within ca. 15 hours.

In a drive under Rv=1/3.2 according to the present invention, the liquid crystal movement speed was 0.3 mm/hr and no yellowing occurred at all.

In a drive under Rv=1/3.4 according to the present invention, the liquid crystal movement speed was 0.2 mm/hr and, also in this case, no yellowing occurred at all.

A comparative liquid crystal cell was prepared in the same manner as in Example 3 above except that the substrates in the peripheral region were also subjected to the rubbing treatment so as to provide a low pretilt angle similarly as in the display region. The comparative cell was also subjected to the refresh drive including application of the basic drive signals shown in FIG. 12 for displaying the pattern shown in FIG. 14.

In a drive under Rv=1/2.4, the liquid crystal movement speed was 0.6 mm/hr, and yellowing occurred at parts $Y_6$ and $Y_{13}$ in addition to the parts $Y_3$ and $Y_4$ in FIG. 14 while yellowing did not occur within ca. 15 hours.

In a drive under Rv=1/3.0, the liquid crystal movement speed was 0.4 mm/hr and yellowing occurred at parts $Y_1$, $Y_2$, $Y_6$ and $Y_{13}$ in addition to the parts at parts $Y_3$ and $Y_4$ in FIG. 14 while yellowing did not occur within ca. 15 hours.

In a drive under Rv=1/3.2, the liquid crystal movement speed was 0.3 mm/hr and yellowing also occurred at peripheral parts $Y_1$, $Y_2$, $Y_5$, $Y_6$, $Y_7$, $Y_8$, $Y_9$, $Y_{13}$, $Y_{16}$, $Y_{17}$ and $Y_{18}$ in FIG. 14.

In a drive under Rv=1/3.4, the liquid crystal movement speed was 0.2 mm/hr and yellowing also occurred at peripheral parts $Y_1$, $Y_2$, $Y_5$, $Y_6$, $Y_7$, $Y_8$, $Y_9$, $Y_{13}$, $Y_{16}$, $Y_{17}$ and $Y_{18}$.

EXAMPLE 4

A sample liquid crystal device was prepared in the same manner as in Example 3 except that the silica particles for surface roughening of the inner surfaces in the display region were not included in the insulating films, whereby the pretilt angle in the display region was 22.5 degrees.

Figure 15:
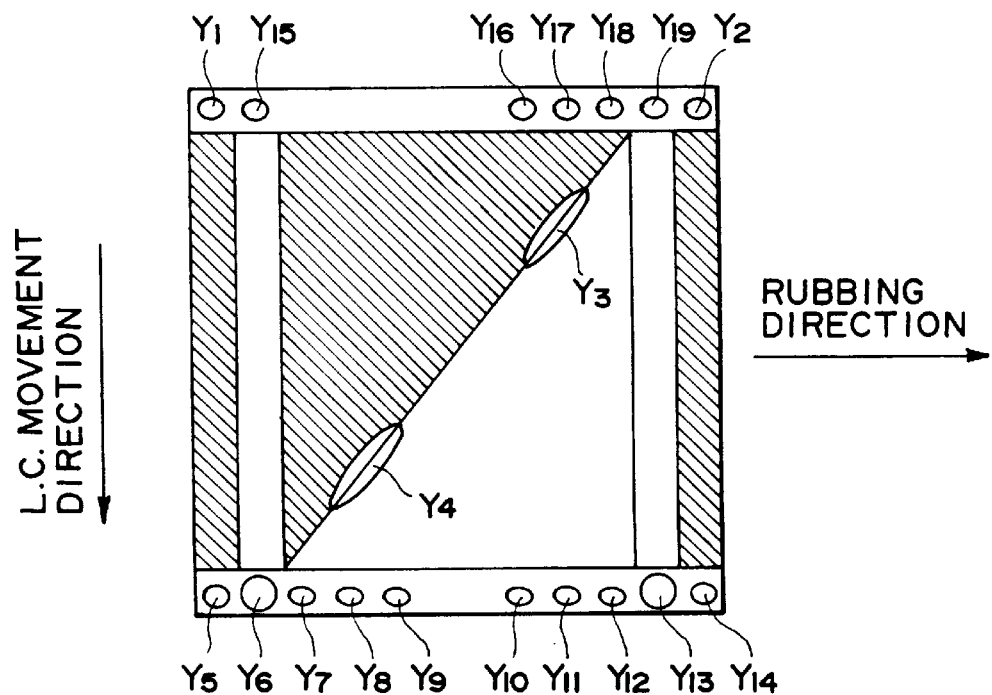

The sample liquid crystal device was subjected to 20 hours of a refresh drive wherein basic drive signals as shown in FIG. 12 were repeatedly applied to repetitively display a pattern shown in FIG. 15. In this Example, the liquid crystal movement speed was changed by changing Vope while keeping Rv at a constant value of 1/2.7.

As a result, in a drive under Vope=25 volts, the liquid crystal movement was 0.7 mm/hr, and yellowing slightly occurred only at $Y_3$ and $Y_4$ in FIG. 15 while yellowing did not occur within ca. 15 hours.

In a drive under Vope=20 volts, the liquid crystal movement speed was 0.4 mm/hour and, also in this case, slight yellowing occurred only at parts $Y_3$ and $Y_4$ in FIG. 15, while the yellowing did not occur within ca. 15 hours.

In a drive under Vope=17.5 volts according to the present invention, the liquid crystal movement speed was 0.3 mm/hr and no yellowing occurred at all.

A comparative liquid crystal cell was prepared in the same manner as in Example 4 above except that the substrates in the peripheral region were also subjected to the rubbing treatment so as to provide an identical alignment state as in the display region. The comparative cell was also subjected to the refresh drive including application of the basic drive signals shown in FIG. 12 for displaying the pattern show in FIG. 15.

In a drive under Vope=25 volts, the liquid crystal movement speed was 0.7 mm/hr, and yellowing occurred at parts $Y_3$, $Y_4$, $Y_5$, $Y_{14}$, $Y_{15}$ and $Y_{19}$ in FIG. 15.

In a drive under Vope=20 volts, the liquid crystal movement speed was 0.4 mm/hr, and yellowing occurred at parts $Y_3$, $Y_4$, $Y_5$, $Y_7$, $Y_{14}$, $Y_{15}$, $Y_{18}$ and $Y_{19}$ in FIG. 15.

In a drive under Vope=17.5 volts, the liquid crystal movement speed was 0.3 mm/hr and yellowing occurred at parts $Y_5$, $Y_7$, $Y_8$, $Y_9$, $Y_{15}$, $Y_{16}$, $Y_{17}$, $Y_{18}$ and $Y_{19}$ in FIG. 15.

As a result of repetition of experiments in the above-described manner, it has been found that the occurrence of yellowing after very long hours of drive depends on the liquid crystal movement speed. Particularly when the liquid crystal movement speed is below 0.3 mm/hr, the yellowing is prevented from occurring around a central part in the display region, so that it is further effective to form an alignment state providing ia larger pretilt angle in the peripheral region. Incidentally, the liquid crystal movement speed referred to herein means an absolute value thereof obtained by disregarding the direction thereof.

Figure 16:
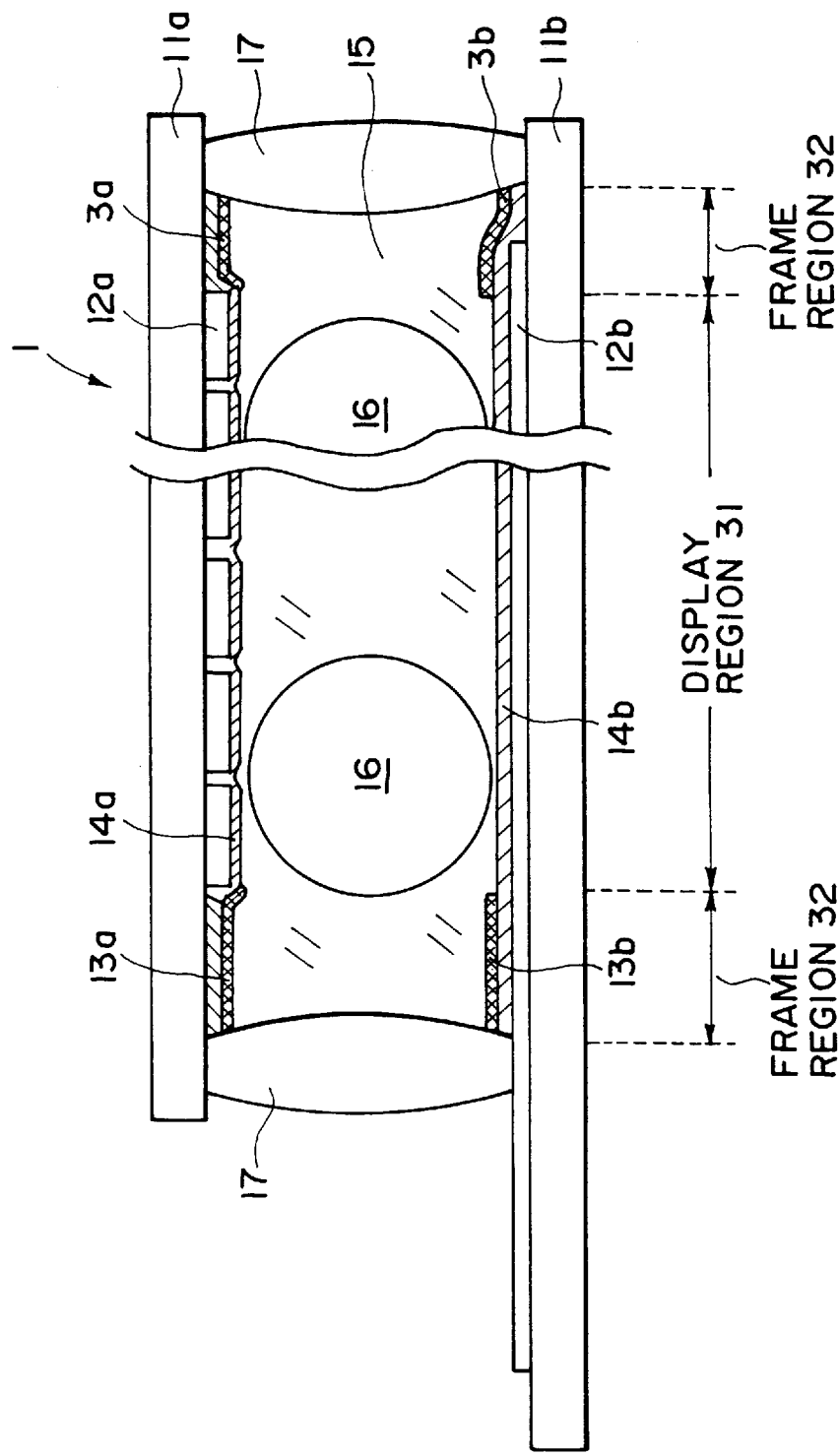
FIGS. 16, 17 and 19 are respectively a schematic sectional view of another embodiment of the liquid crystal device according to the invention.

FIG. 16 is a schematic sectional view (similar to FIG. 5) showing another embodiment of the liquid crystal device (cell) according to the present invention. The cell includes a pair of substrates 11a and 11b having thereon opposing electrodes 12a and 12b, homeotropic alignment films 3a and 3b for providing a higher pretilt angle in a frame region (peripheral region) 32, and alignment films 14a and 14b different from the homeotropic alignment films. Between the aligning films 14a and 14b, a liquid crystal material 15 showing a chiral smectic phase is disposed in a layer in a thickness determined by a spacer 16 and confined by a sealing adhesive 17 disposed at the peripheral part.

The cell includes a display region (effective optical modulation region) 31 comprising vertically 12×laterally 22 pixels composed by two-dimensional matrix electrodes and a frame region (peripheral region) 32 surrounding the display region 31 and having a width of at least two pixels. The display region 31 and the frame region 32 are subjected to mutually different aligning treatments. In this instance, it is preferred to apply an aligning treatment so as to provide a larger pretilt angle (i.e., an angle of longer axes of liquid crystal molecules in the neighborhood of a substrate boundary surface with respect to the boundary surface) in the display region 31 than in the display region 31. It is further preferred that the longer axes of the molecules in the frame region are aligned homeotropically, i.e., at an angle of at least 45 degrees or, more preferably, substantially perpendicularly to the substrate inner surface.

On the other hand, in the display region (as effective optical modulation region), it is preferred to provide a pretilt angle of 1–25 degrees, more preferably 1–20 degrees.

A liquid crystal cell as shown in FIG. 16 may be produced by using electrode materials, alignment film materials, etc., similar to those described above.

More specifically, a transparent substrate of, e.g., glass is provided with a transparent conductor film by a vapor deposition method, such as CVD, sputtering or iron plating, and the conductor film is patterned into stripes. Thereafter, an insulating film may be formed thereon by vapor deposition as described above or application of a coating solution. Then, an alignment film is formed thereon, e.g., by spin coating of a polyamide acid solution, followed by baking and rubbing. A pair of treated substrate may be provided in this manner. On one of the pair of substrates, spacer beads are dispersed and a sealing agent is applied onto a periphery thereof, and the other substrate is applied thereto while leaving an injection port, through which a liquid crystal material is injected and gradually cooled into a chiral smectic phase. Thus, a chiral smectic liquid crystal cell (device) may be completed.

For aligning treatments in the display region and the peripheral region, a low-pretilt alignment film for providing a low pretilt angle is formed in the display region, and a homeotropic alignment film as a high-pretilt alignment film for providing a high pretilt angle is formed in the peripheral region. Further, by masking the alignment film in the peripheral region, the alignment film in the display region is selectively rubbed to provide a low-pretilt alignment in the display region and a high-pretilt alignment in the peripheral region.

The rubbing may be performed in a manner identical to those described above.

EXAMPLE 5

In this Example, a liquid crystal cell having a structure as shown in FIG. 16 was prepared. More specifically, two 1.1 mm-thick glass substrates 11a and 11b were coated by sputtering with 150 nm-thick ITO films 12a and 12b, which were then patterned into stripe electrodes of 170 μm in width with a spacing of 30 μm therebetween and coated with 90 nm-thick $Ta_2O_3$ insulating films.

Further, each substrate was coated with a polyamide acid solution ("LQ-1800" (trade name), available from Hitachi Kasei Kogyo K.K.) by flexographic printing, followed by baking at 270° C. for 1 hour, to form a 20 nm-thick polyimide alignment film. Then, a homeotropic aligning treatment agent ("ODS-E" (trade name), available from Chisso K.K. was selectively applied onto a part of the substrate in the peripheral region, and dried at 80° C. for 30 min. to form a ca. 40 nm-thick homeotropic alignment film.

A masking member was disposed to mask the peripheral region, and the remaining part of the substrate in the display region was subjected to two times of rubbing under the conditions of a pressing depth ε of 0.35 mm, a roller rotation speed of 1000 rpm and a roller feed rate of 30 mm/sec.

A liquid crystal device having a structure shown in FIG. 16 was prepared by dispersing spacer beads 16 (of silica) having an average diameter of ca. 1.5 μm on one substrate 11a (or 11b) of the substrates treated in the above-described manner, applying a sealing adhesive 17 of an epoxy resin onto the other substrate 11b (or 11a) by screen printing and superposing and applying them to each other, so that their rubbing directions were substantially parallel to each other. Each cell was filled with a pyrimidine-based ferroelectric liquid crystal having the following phase transition series and heated to isotropic phase under a reduced pressure by a capillary effect, followed by gradual cooling to obtain a liquid crystal device:

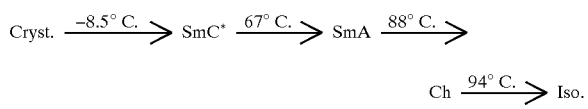

The liquid crystal cell thus-prepared showed a pretilt angle of ca. 18 degrees all over the display region and a homeotropic alignment state giving no bright state under cross-nicol polarizers in the peripheral region.

According to the present invention, it is possible to provide a liquid crystal cell wherein yellowing is more effectively suppressed and, even if the yellowing is caused once, the yellowing can be extinguished rather easily.

Figure 17:
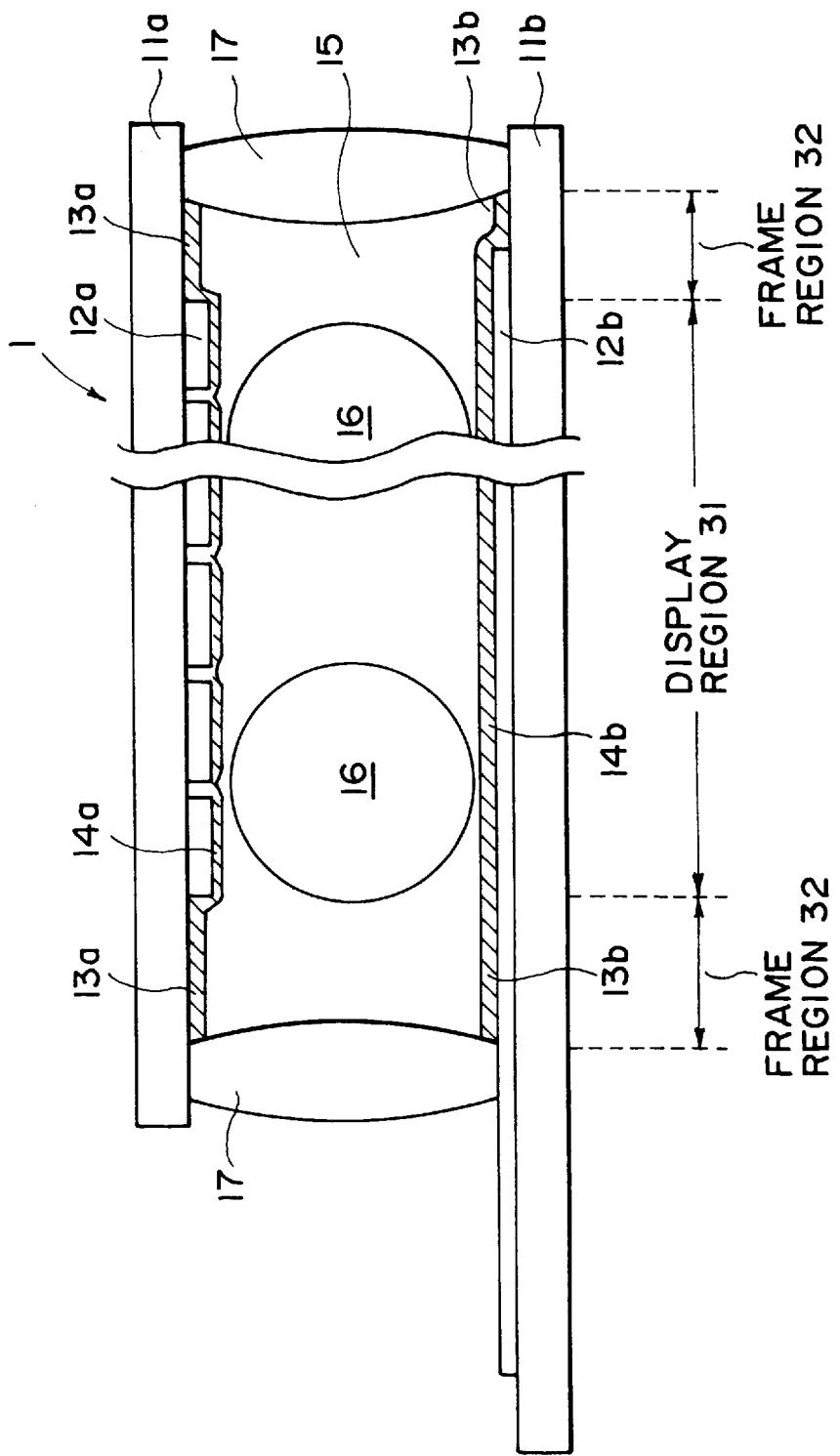

FIG. 17 is a schematic sectional view showing another embodiment of the liquid crystal device (cell) according to the present invention. The cell includes a pair of substrates 11a and 11b having thereon opposing electrodes 12a and 12b, and alignment films 14a and 14b including peripheral portions 13a and 13b for providing a high pre-tilt angle through non-application of rubbing. Between the aligning films 14a and 14b, a liquid crystal material 15 showing a chiral smectic phase is disposed in a layer in a thickness determined by a spacer 16 and confined by a sealing adhesive 17 disposed at the peripheral part.

The cell includes a display region (effective optical modulation region) 31 comprising vertically 12×laterally 22 pixels composed by two-dimensional matrix electrodes and a frame region (peripheral region) 32 surrounding the display region 31. The display region 31 and the frame region 32 having a width of at least two pixels are subjected to mutually different aligning treatments. In this instance, it is preferred to apply an aligning treatment so as to provide a larger pretilt angle (i.e., an angle of longer axes of liquid crystal molecules in the neighborhood of a substrate boundary surface with respect to the boundary surface) in the frame region 32 than in the display region 31. It is further preferred that the longer axes of the molecules in the frame region are aligned homeotropically, i.e., at an angle of at least 45 degrees or, more preferably, substantially perpendicularly to the substrate inner surface.

On the other hand, in the display region (as effective optical modulation region), it is preferred to provide a pretilt angle of 1–25 degrees, more preferably 1–20 degrees.

A liquid crystal cell as shown in FIG. 17 may be produced by using electrode materials (12a, 12b), alignment film materials (14a, 14b), etc., similar to those described above.

More specifically, a transparent substrate (11a, 11b) of, e.g., glass is provided with a transparent conductor film (12a, 12b) by a vapor deposition method, such as CVD, sputtering or iron plating, and the conductor film is patterned into stripes. Thereafter, an insulating film may be formed thereon by vapor deposition as described above or application of a coating solution. Then, an alignment film (14a, 14b) is formed thereon, e.g., by spin coating of a polymer film precursor solution. Then, the peripheral region of the alignment film is masked with a film applied thereto with an adhesive as desired and then subjected to a rubbing in the above-described manner, followed by removal of the film, to leave the rubbed alignment film 14a (or 14b) while leaving the non-rubbed portion 13a (or 13b) thereof.

In order to provide a high pretilt angle, it is also possible to form another alignment film, it is also possible to form another alignment film, such as a homeotropic alignment film (e.g., "ODS-E" (trade name), available from Chisso K.K.) on the part 13a (or 13b) of the alignment film 14a (or 14b) and, after further masking the part 13a (or 13b), to rub the uncovered part of the alignment film 14a (or 14b) selectively.

On one of the pair of substrates thus treated, spacer beads may be dispersed and a sealing agent is applied onto a periphery thereof, and the other substrate is applied thereto while leaving an injection port, through which a liquid crystal material is injected and gradually cooled into a chiral smectic phase. Thus, a chiral smectic liquid crystal cell (device) may be completed.

The masking film for providing a high-pretilt peripheral region of the alignment film may desirably comprise a flexible polymer film preferably having a thickness of at most 100 μm, more preferably at most 50 μm.

Figure 18:
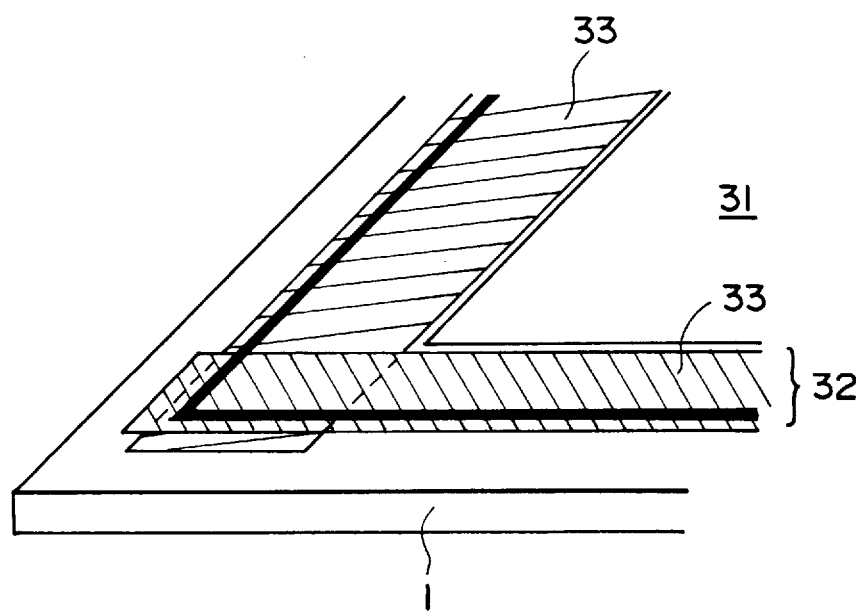
FIG. 18 is a partial illustration of a substrate immediately after application of tapes or films.

FIG. 18 is a partial perspective view of a state wherein two stripe-form masking films 13 are applied onto a peripheral region 32 surrounding a display region 31 of a substrate. As shown in FIG. 18, two stripe-form films 13 are applied onto adjacent sides and in superposition at a corner therebetween. Needless to say, similar masking films are applied also onto other sides not shown of the substrate.

When a thin plate such as that of stainless steel, is used as a masking member for rubbing, the pile yarn of the rubbing cloth can be worn by the corner of the thin-plate masking member and the worn portion thereof can enter between the masking member and the rubbed substrate. This is liable to cause a cell thickness disorder. Further, by repetition of such steps, the surface of the thin plate is soiled to make difficult the maintenances of the rubbing apparatus.

According to this embodiment of the present invention using a masking film for rubbing, the above problems are all solved.

EXAMPLE 6

In this Example, a liquid crystal cell having a structure as shown in FIG. 17 was prepared. More specifically, two 1.1 mm-thick glass substrates 11a and 11b were coated by sputtering with 150 nm-thick ITO films 12a and 12b, which were then patterned into stripe electrodes of 170 μm in width with a spacing of 30 μm therebetween and coated with 90 nm-thick $Ta_2O_3$ insulating films.

Further, each substrate was coated with a polyamide acid solution ("LQ-1800" (trade name), available from Hitachi Kasei Kogyo K.K.) by flexographic printing, followed by baking at 270° C. for 1 hour, to form a 20 nm-thick polyimide alignment film.

Then, the peripheral region of each substrate was selectively masked by a 50 μm-thick polyester tape with an adhesive applied to one face thereof while a dust-free paper slip was inserted at a part between the tape and the substrate. The substrate was subjected to rubbing with a rubbing cloth comprising nylon pile yarn.

Then, the masking tape was peeled apart and the rubbed substrate was washed with isopropyl alcohol.

A liquid crystal device having a structure shown in FIG. 17 was prepared by dispersing spacer beads 16 (of silica) having an average diameter of ca. 1.5 μm on one substrate 11a (or 11b) of the substrates treated in the above-described manner, applying a sealing adhesive 17 of an epoxy resin onto the other substrate 11b (or 11a) by screen printing and superposing and applying them to each other, so that their rubbing directions were substantially parallel to each other. Each cell was filled with a pyrimidine-based ferroelectric liquid crystal having the following phase transition series and heated to isotropic phase under a reduced pressure by a capillary effect, followed by gradual cooling to obtain a liquid crystal device:

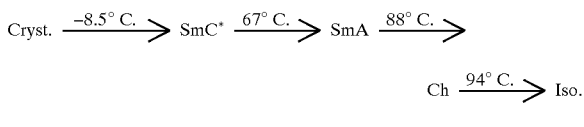

The liquid crystal cell thus-prepared showed a pretilt angle of ca. 18 degrees all over the display region and a homeotropic alignment state giving no bright state under cross-nicol polarizers in the peripheral region. No waste or refuse of the nylon pile yarn was observed between the substrates.

According to the present invention, it is possible to easily provide a liquid crystal cell wherein yellowing is more effectively suppressed and, even if the yellowing is caused once, the yellowing can be extinguished rather easily.

Figure 19:
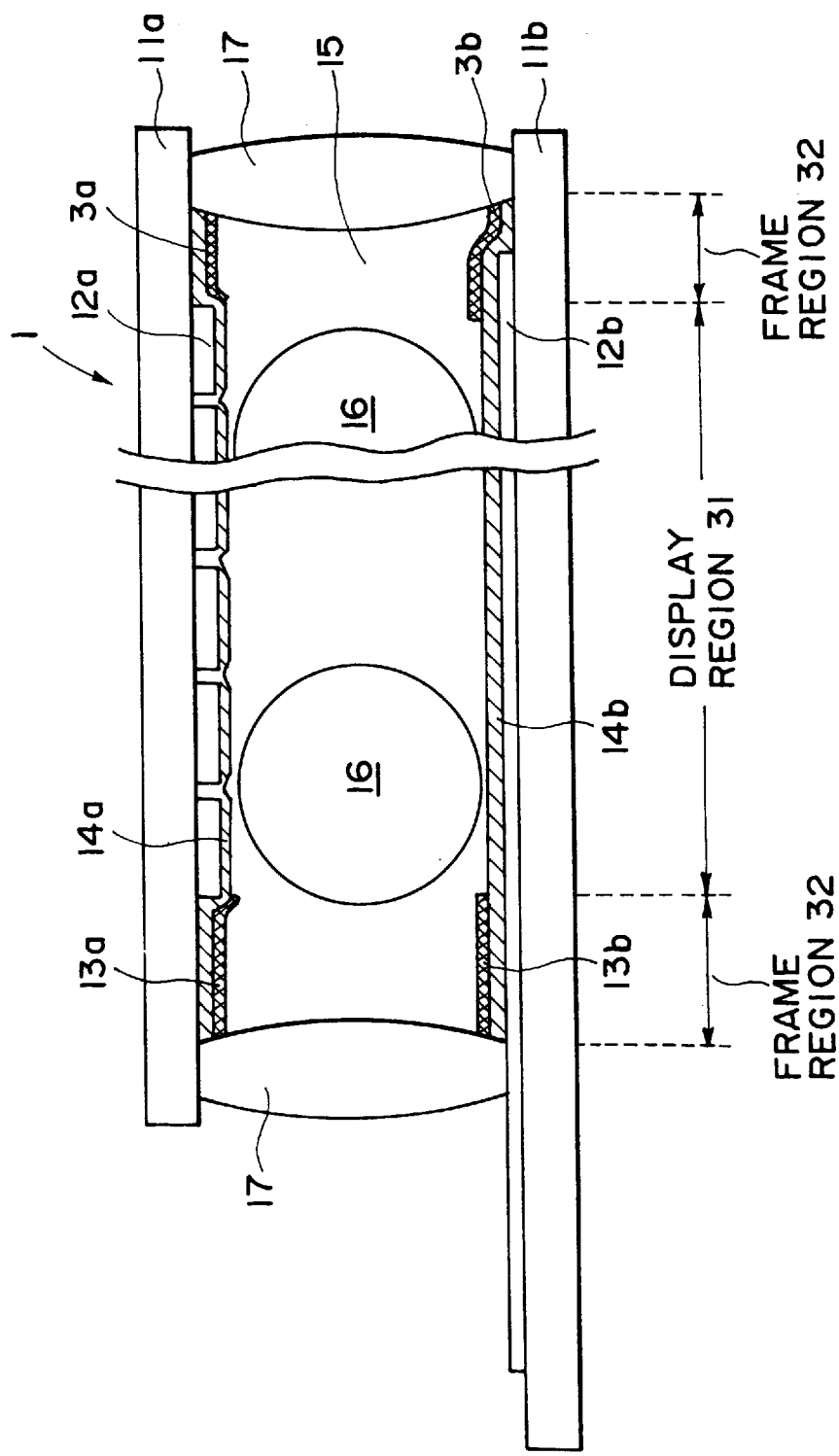

FIG. 19 is a schematic sectional view showing another embodiment of the liquid crystal device (cell) according to the present invention. The cell includes a pair of substrates 11a and 11b having thereon opposing electrodes 12a and 12b, alignment films 3a and 3b comprising a perfluoro polymer for providing a higher pretilt angle in a frame region (peripheral region) 32, and alignment films 14a and 14b. Between the aligning films 14a and 14b, a liquid crystal material 15 showing a chiral smectic phase is disposed in a layer in a thickness determined by a spacer 16 and confined by a sealing adhesive 17 disposed at the peripheral part.

The cell includes a display region (effective optical modulation region) 31 comprising vertically 12×laterally 22 pixels composed by two-dimensional matrix electrodes and a frame region (peripheral region) 32 surrounding the display region 31 and having a width of at least two pixels. The display region 31 and the frame region 32 are subjected to mutually different aligning treatments. In this instance, it is preferred to apply an alignment treatment to the inner surfaces of the substrates so that the liquid crystal molecules in the frame region 32 are aligned at a larger pretilt angle than the liquid crystal molecules in the display region 31. It is further preferred that the longer axes of the molecules in the frame region are aligned homeotropically, i.e., at an angle of at least 45 degrees or more preferably, substantially perpendicularly to the substrate inner surface.

On the other hand, in the display region (as effective optical modulation region), it is preferred to provide a pretilt angle of 1–25 degrees, more preferably 1–29 degrees.

Opposing electrodes 12a and 12b for constituting a liquid crystal cell as shown in FIG. 17 may comprise materials as described above, suitable examples of which may include transparent conductors, such as tin oxide, indium oxide, indium tin oxide (ITO), etc. The transparent conductor may be accompanied with a low-resistivity metal conductor layer. The thickness may desirably be set to 40–200 nm.

The alignment films 14a and 14b for alignment control of liquid crystal molecules may comprise a film of an organic material, such as polyimide, polypyrrole, polyvinyl alcohol, polyamideimide, polyesterimide, polyparaxylylene, polyester, polycarbonate, polyvinyl acetal, polyvinyl chloride, polyamide, polystyrene, cellulosic resin, acrylic resin or melamine resin; or a film of an inorganic material, such as an obliquely deposited film of SiO. The thickness may desirably be set to 5–100 nm.

The alignment films 3a and 3b formed in the peripheral region on the substrates may preferably comprise a perfluoro polymer. It is particularly preferred to use a perfluoro polymer having an alicyclic skeleton. A specific example of such a perfluoro polymer may be represented by the following formula:

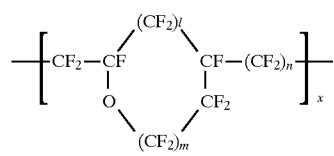

wherein l and n are 0 or a positive integer of at least 1; m is a positive integer of at least 1, and x is a positive integer of at least 1.

Further, it is preferred to apply a rubbing treatment to the alignment film at least in the display region to provide a pretilt angle in a prescribed range. By using the above-mentioned alignment film comprising a perfluoro polymer in the peripheral region according to the present invention, the whole inner surface of a substrate can be non-selectively rubbed, whereby the production step can be specified.

More specifically, a transparent substrate of, e.g., glass is provided with a transparent conductor film by a vapor deposition method, such as CVD, sputtering or iron plating, and the conductor film is patterned into stripes. Thereafter, an insulating film may be formed thereon by vapor deposition as described above or application of a coating solution. Then, an alignment film is formed thereon, e.g., by spin coating of a polyamide acid solution, followed by baking. Further, an alignment film comprising a perfluoro polymer is formed selectively in the peripheral region of the substrate. Then, the whole inner surface of the substrate is subjected to rubbing. A pair of treated substrate may be provided in this manner. On one of the pair of substrates, spacer beads are dispersed and a sealing agent is applied onto a periphery thereof, and the other substrate is applied thereto while leaving an injection port, through which a liquid crystal material is injected and gradually cooled into a chiral smectic phase. Thus, a chiral smectic liquid crystal cell (device) may be completed.

EXAMPLE 7

In this Example, a liquid crystal cell having a structure as shown in FIG. 19 was prepared. More specifically, two 1.1 mm-thick glass substrates 11a and 11b were coated by sputtering with 150 nm-thick ITO stripe electrodes 12a and 12b, which were formed in a width of 170 μm and with a spacing of 30 μm therebetween and further coated with 90 nm-thick $Ta_2O_3$ insulating films.

Further, each substrate was coated with a polyamide acid solution ("LQ-1800" (trade name), available from Hitachi Kasei Kogyo K.K.) by flexographic printing, followed by baking at 270° C. for 1 hour, to form a 20 nm-thick polyimide alignment film. Then, a perfluoro polymer having an alicyclic skeleton ("CYTOP CTX-807 (trade name) available from Asahi Glass K.K.) was selectively applied by flexographic printing onto a part of the substrate in the peripheral region, and baked at 150° C. for 1 hr. to form a ca. 40 nm-thick homeotropic alignment film.

Then, the whole inner surface having the alignment films of the substrate was subjected to two times of rubbing under the conditions of a pressing depth $\epsilon$ of 0.35 mm, a roller rotation speed of 1000 rpm and a roller feed rate of 30 mm/sec.

A liquid crystal device having a structure shown in FIG. 9 was prepared by dispersing spacer beads 16 (of silica) having an average diameter of ca. 1.5 μm on one substrate 11a (or 11b) of the substrates treated in the above-described manner, applying a sealing adhesive 17 of an epoxy resin onto the other substrate 11b (or 11a) by screen printing and superposing and applying them to each other, so that their rubbing directions were substantially parallel to each other. The cell was filled with a pyrimidine-based ferroelectric liquid crystal having the following phase transition series and heated to isotropic phase under a reduced pressure by a capillary effect, followed by gradual cooling to obtain a liquid crystal device:

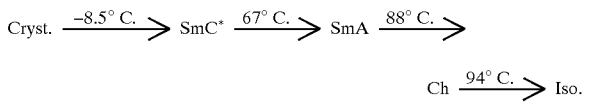

The liquid crystal cell thus-prepared showed a pretilt angle of ca. 18 degrees all over the display region and a homeotropic alignment state giving no bright state under cross-nicol polarizers in the peripheral region.

Further, the liquid crystal movement in the device was performed in a manner as described with reference to FIG. 11A. Thus, the liquid crystal device was placed in a display state including stripes including one wherein the liquid crystal molecules were uniformly placed in a stable state providing an average molecular axis 21a and another wherein the liquid crystal molecules are uniformly placed in a stable state providing an average molecular axis 21b as shown in FIG. 11A, and the device was continually supplied rectangular waves having a pule width of 25 μsec, a voltage amplitude of 40 volts and a ½ duty for ca. 20 hours to evaluate the cell thickness change at the parts A and B. As a result, no cell thickness change was observed before and after the voltage application.

A comparative liquid crystal cell was prepared in the same manner as in Example 7 except that the provision of the homeotropic alignment film in the peripheral region was omitted. The cell provided a homogeneous alignment giving a pretilt angle of 17 degrees over the entire area including the peripheral region.

The comparative liquid crystal cell was subjected to evaluation of the liquid crystal movement in the same manner as in Example 7 whereby the cell thickness increased by 30% at part A and by 32% at part B, respectively compared with those before the voltage application.

The above-embodiments described with reference to Examples 1–7 may preferably be combined appropriately with each other in providing a liquid crystal device.

For example, according to a preferred combination, the opposing surfaces of a pair of substrates are subjected to an aligning treatment so as to provide an identical direction of liquid crystal molecular movement regardless of one or the other of two stable states, and a non-homogeneous alignment film comprising a perfluoropolymer is applied in the peripheral region of the substrate without being rubbed by film-masking.

According to another preferred combination, a liquid crystal device is driven under a condition that any of the liquid crystal molecular movement speed $V_1$ and $V_2$ in two stable states does not exceed 0.3 mm/hr, and a non-homogeneous alignment film comprising a perfluoropolymer is applied in the peripheral region of the substrate without being rubbed by film-masking.

In any of the above combinations, it is also possible to omit one of the perfluoropolymer alignment film and the film masking.

A liquid crystal device according to any one of the above-descried embodiments may suitably be incorporated in an image display apparatus.

Figure 20:
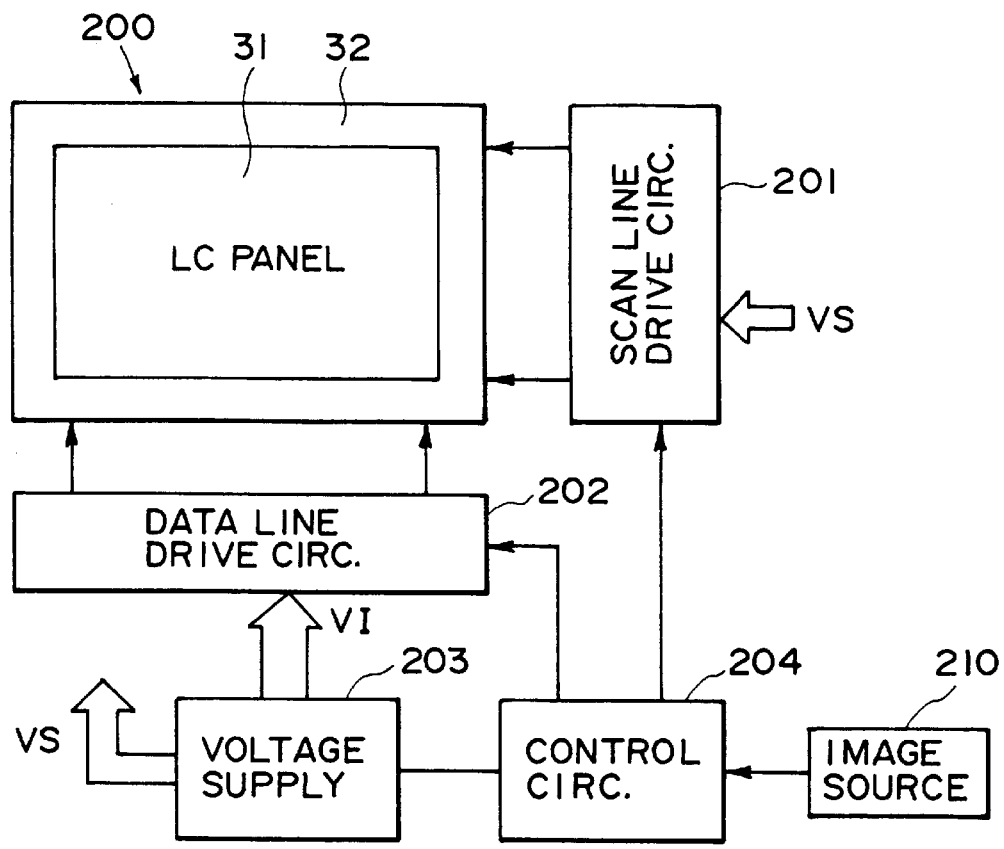
FIG. 20 is a block diagram of an image display apparatus including a liquid crystal device according to the invention.

FIG. 20 is a block diagram of such an image display apparatus, particularly a control system thereof. Referring to FIG. 8, the display apparatus includes a display device 200 which includes a liquid crystal device (panel) including the effective display region 31 and the peripheral region 32 as described above and, additionally, cross nicol polarizers (or one polarizers in the case of a reflection-type display device) and a backlight optionally used. The display apparatus further includes a scanning line drive circuit 201 including a decoder and switches; a data line drive circuit 202 including a latch circuit, a shift register, and switches; a reference voltage-generating circuit 203 for supplying multiple levels of reference voltages to the circuits 201 and 202; a control circuit 204 including a CPU and a RAM for retaining image data; and an image signal supply 210 for supplying input image data, such as an image sensor or a computer for operating an application program.

Figure 21:
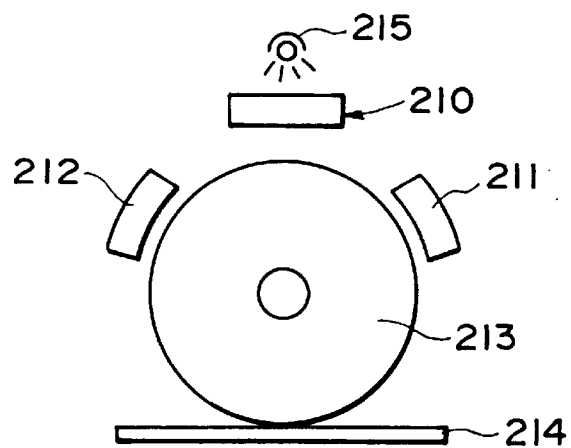
FIG. 21 is a schematic illustration of an image forming apparatus including a liquid crystal device according to the invention.

Next, an image forming apparatus including a liquid crystal device according to the present invention will be described. FIG. 21 is an illustration of such an image forming apparatus. Referring to FIG. 21, the image forming apparatus includes an exposure means 210 for forming an electrostatic image on a photosensitive member 213 which comprises a photoconductor, such as hydrogenated amorphous silicon containing carbon or an organic photoconductor (OPC). The exposure means 210 includes a liquid crystal device as described above in combination with polarizing means as an array or matrix of light valves and is backed with a light source 215. The image forming apparatus further includes a developing means 211 for developing the electrostatic image on the photosensitive member 213 with a developer to form a toner image on the photosensitive member 213. The toner image formed on the photosensitive member is transferred onto a recording medium 214, such as plain paper. The residual toner on the photosensitive member 213 is removed by a cleaning means 212.

The present invention will also be effectively applied to a device using an anti-ferroelectric liquid crystal which is a smectic liquid crystal showing ferroelectricity under its driving conditions similarly as a ferroelectric liquid crystal to which the present invention is principally directed.

What is claimed is:

1. A liquid crystal device comprising a pair of oppositely disposed substrates having opposing inner surfaces and opposing electrodes thereon, and a chiral smectic liquid crystal assuming two stable states disposed between the opposing electrodes, said liquid crystal device having an effective optical modulation region and a peripheral region outside the effective optical modulation region; wherein in the effective optical modulation region, the liquid crystal placed in one of the two stable states moves at a velocity $V_1$ under application of an electric field and the liquid crystal placed in the other of the two stable state moves at a velocity $V_2$ under application of the electric field so that one of $V_1$ and $V_2$ having a larger absolute value is at most 0.3 mm/hr, and the effective optical modulation region and the peripheral region have been subjected to different aligning treatments.

2. A liquid crystal device according to claim 1, wherein the opposing inner surfaces of said pair of substrates are respectively provided an alignment film having a roughness.

3. A liquid crystal device according to claim 2, wherein the roughness of the alignment film on at least one substrate is provided by minute particles having an average diameter of 1–20 nm contained in the alignment film per se or in a layer below the alignment film.

4. A liquid crystal device according to claim 1, wherein said chiral smectic liquid crystal is a ferroelectric liquid crystal.

5. A liquid crystal device according to claim 1, wherein the inner surfaces of the substrates in the peripheral region are provided with a film of a perfluoropolymer and subjected to rubbing while being masked with a masking film.

* * * * *

UNITED STATES PATENT AND TRADEMARK OFFICE
CERTIFICATE OF CORRECTION

PATENT NO. : 5,877,836

DATED : March 2, 1999

INVENTOR(S) : SEISHI MIURA ET AL.                Page 1 of 3

It is certified that error appears in the above-identified patent and that said Letters Patent is hereby corrected as shown below:

On the title page, item

[56] REFERENCES CITED

Other Publications
   "Physic," should read --Physics,--.

COLUMN 4

Line 46, "is a schematic view" should read
     --are schematic views--.
   Line 50, "is a section view" should read
     --are sectional views--.

COLUMN 5

Line 3, "illustrate" should read --illustrates--.
   Line 5, "a view" should read --views--.
   Line 7, "a" should be deleted.
   Line 8, "view" should read --views--.

COLUMN 7

Line 39, "$R_1$.(Cell Structure)" should read
     --$R_1$.
       (Cell Structure)--.

UNITED STATES PATENT AND TRADEMARK OFFICE
CERTIFICATE OF CORRECTION

PATENT NO. : 5,877,836

DATED : March 2, 1999

INVENTOR(S) : SEISHI MIURA ET AL.

It is certified that error appears in the above-identified patent and that said Letters Patent is hereby corrected as shown below:

COLUMN 8

Line 65, "method,d" should read --method, d--.

COLUMN 10

Line 15, "the" should be deleted.

COLUMN 15

Line 59, "intersect" should read --so as to intersect--.
  Line 60, "<øc<20deg.)" should read --<øc<20deg.).--.

COLUMN 18

Line 33, "substrate" should read --substrates--.

COLUMN 20

Line 16, "it is also possible to form" should be deleted.
  Line 17, "another alignment film," should be deleted.

UNITED STATES PATENT AND TRADEMARK OFFICE
CERTIFICATE OF CORRECTION

PATENT NO. : 5,877,836

DATED : March 2, 1999

INVENTOR(S) : SEISHI MIURA ET AL.

It is certified that error appears in the above-identified patent and that said Letters Patent is hereby corrected as shown below:

COLUMN 23

Line 46, "pule" should read --pulse--.

COLUMN 24

Line 27, "polarizers" should read --polarizer--.

Signed and Sealed this

First Day of February, 2000

*Attest:*

Q. TODD DICKINSON

*Attesting Officer*  *Acting Commissioner of Patents and Trademarks*

UNITED STATES PATENT AND TRADEMARK OFFICE
CERTIFICATE OF CORRECTION

PATENT NO. : 5,877,836

DATED : March 2, 1999

INVENTOR(S) : Seishi Miura, et al.

It is certified that error appears in the above-identified patent and that said Letters Patent is hereby corrected as shown below:

Column 22, line 49, "substrate" should be --substrates--.

Signed and Sealed this

Twenty-fourth Day of October, 2000

Attest:

Q. TODD DICKINSON

*Attesting Officer*     *Director of Patents and Trademarks*